(12) United States Patent
Haijima

(10) Patent No.: US 6,683,654 B1
(45) Date of Patent: Jan. 27, 2004

(54) FLANGE BACK FOCUS ADJUSTMENT MECHANISM FOR A VIDEO CAMERA

(75) Inventor: Hideki Haijima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/294,103

(22) Filed: Apr. 19, 1999

(30) Foreign Application Priority Data

Apr. 20, 1998 (JP) .......................... 10-109508

(51) Int. Cl.⁷ .................. H04N 5/225; H04N 5/228; G02B 13/16; G02B 15/14

(52) U.S. Cl. ................. 348/374; 348/335; 348/345; 359/699; 359/701; 359/696

(58) Field of Search ................. 348/374, 345, 348/335; 359/699, 701, 696

(56) References Cited

U.S. PATENT DOCUMENTS

| 4,834,514 A | * | 5/1989 | Atsuta et al. | 359/699 |
| 5,032,919 A | * | 7/1991 | Randmae | 348/345 |
| 5,400,073 A | * | 3/1995 | Morioka et al. | 348/335 |
| 5,404,190 A | * | 4/1995 | Kohno et al. | 396/529 |
| 5,739,853 A | * | 4/1998 | Takahashi | 348/335 |

FOREIGN PATENT DOCUMENTS

JP 11-072689 * 3/1999 ............ G02B/7/04

* cited by examiner

Primary Examiner—Wendy R. Garber
Assistant Examiner—James Hannett
(74) Attorney, Agent, or Firm—Frommer Lawrence & Haug LLP; William S. Frommer; Leonard J. Santisi

(57) ABSTRACT

A video camera capable of always stably performing adjustment of a flange back focus of a CCD. Three cam following ribs of three cam followers formed on a CCD holder are kept in pressure contact with three cams of an adjuster ring by means of three springs.

4 Claims, 46 Drawing Sheets

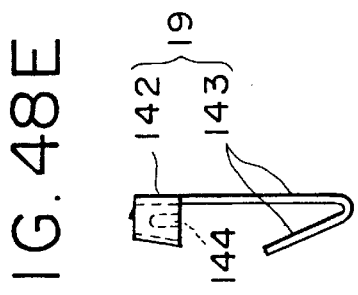
FIG. 48A
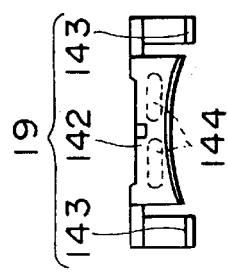
FIG. 48C
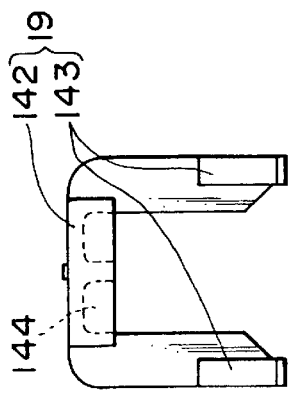
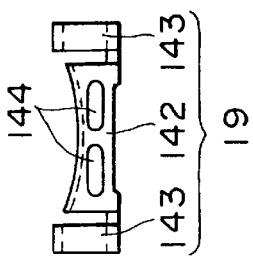
FIG. 48E
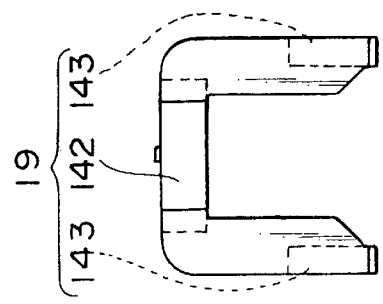
FIG. 48B

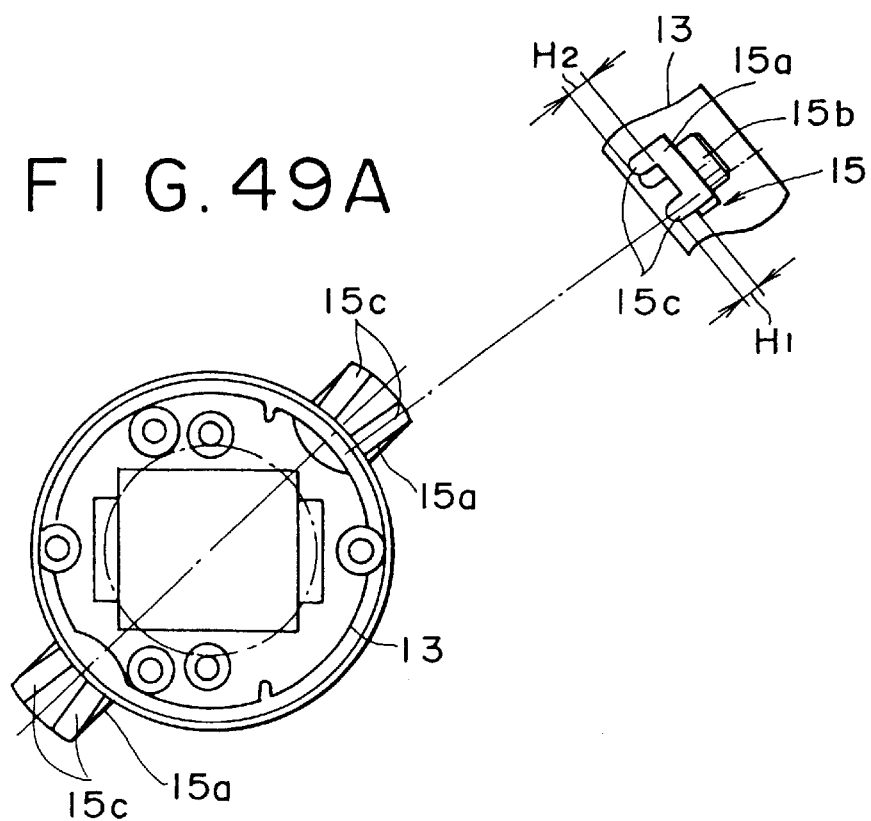

FLANGE BACK FOCUS ADJUSTMENT MECHANISM FOR A VIDEO CAMERA

BACKGROUND OF THE INVENTION

The present invention relates to a video camera most suitable for use of such as a CCD camera, and more particularly to a video camera having a front panel, on which a lens mount is formed, and an imaging device such as a CCD is spaced at an adjustable distance from the lens mount along an optical axis.

A CCD camera as an example of the video camera has already been proposed by the present applicant as disclosed in Japanese Patent Application No. Hei5-258848, for example. FIGS. 51 to 53 show such a CCD camera 1 in the related art. The exterior of the CCD camera 1 is composed of three separate parts, i.e., a front panel 2, a camera case 3, and a rear panel 4. The front panel 2 is formed by die casting such as aluminum die casting, or it is composed of a front panel chassis 2A formed by die casting and a front panel cover 2B formed by molding of a synthetic resin or the like for covering the front panel chassis 2A. The camera case 3 is composed of an upper case and a lower case each formed from a sheet metal or the like. The rear panel 4 is composed of a rear panel chassis formed from a sheet metal or the like and a rear panel cover formed as a molded part for covering the rear panel chassis. The front panel 2 has a front wall 2a formed with an annular lens mount 5 perpendicular to an optical axis P as surrounding the optical axis P. The annular lens mount 5 is formed over its inner circumference with a lens mounting portion 6 such as a tapped hole. Although not shown, a lens such as a C-mount lens and a CS-mount lens is removably mounted to the lens mount 5.

Installed inside the front panel 2 of the CCD camera 1 is a flange back focus adjusting mechanism 11 for adjusting a flange back focus of a CCD 12 as an imaging device with respect to the lens mount 5 according to the kind of the lenses (e.g., a C-mount lens and a CS-mount lens) removably mounted to the lens mount 5. The flange back focus adjusting mechanism 11 includes the CCD 12, a substantially circular CCD holder 13 formed of a synthetic resin as an imaging device holder, a circular adjuster ring 14 formed of a synthetic resin, a pair of cam followers 15 formed on the outer circumference of the CCD holder 13 so as to be circumferentially equally spaced at 180° from each other, a pair of arcuate cams 16 formed on the inner circumference of the adjuster ring 14 so as to be circumferentially equally spaced at 180° from each other and to face the cam followers 15 in the direction shown by an arrow a, a pair of compression springs 17 as means for pressing the cam followers 15 onto the cams 16 in the direction shown by an arrow b opposite to the arrow a, a ring holder plate 18 as a ring holding member formed from a sheet metal or the like for holding the adjuster ring 14 from its rear side in the direction of the arrow a, and a lock member 19 for locking the adjuster ring 14. The CCD 12 is preliminarily mounted in the CCD holder 13 together with a filter bracket 20, a filter 21, a rubber seal 22, a CCD bracket 23, and a CCD board 24 in perpendicular relationship with the optical axis P.

The front panel 2 has a rear wall 2b from which a cylindrical portion 25 projects parallel to the optical axis P in the direction of the arrow b. The flange back focus adjusting mechanism 11 is assembled by first mounting the springs 17, the CCD holder 13, the adjuster ring 14, the ring holder plate 18, and the lock member 19 in this order in the direction of the arrow a into the front panel 2 at inner and outer circumferential portions of the cylindrical portion 25, and then fastening the ring holder plate 18 at its four corners to the rear wall 2b of the front panel 2 by means of four screws 26 against the biasing forces of a pair of springs 17. The lock member 19 is mounted between the adjuster ring 14 and a side wall 2c of the front panel 2, and is releasably pressed on the adjuster ring 14 by a set screw 27 laterally screwed through the side wall 2c in a direction perpendicular to the optical axis P.

The front panel 2 has upper and lower walls 2d formed with a pair of upper and lower slits 28 in cooperation with upper and lower recesses of the camera case 3, and the adjuster ring 14 is exposed at its upper and lower portions through the upper and lower slits 28. Accordingly, by rotating the adjuster ring 14 at these exposed portions, a pair cams 16 operate to axially move the cam followers 15 in the directions of the arrows a and b along the optical axis P in cooperation with the springs 17, thereby adjusting the flange back focus of the CCD 12 with respect to the lens mount 5. As shown in FIG. 52, connectors 31, terminal strips 32, switches 33, and a volume controller 34 are mounted on the rear panel 4.

As shown in FIGS. 49A and 49B and FIGS. 50A and 50B showing the cam mechanism of the CCD camera 1 in the related art, each of the pair of cam followers 15 of the CCD holder 13 is integrally formed with two radially extending ribs 15c having different height $H_1$ and $H_2$ in the direction of the optical axis P. The two ribs 15c of each cam follower 15 are kept in pressure contact with three tilted cam surfaces 16a, 16b, and 16c of the corresponding cam 16 by the corresponding spring 17 in the direction of the optical axis P. The three tilted cam surfaces 16a, 16b, and 16c are different in angle of tilt and height in the direction of the optical axis P.

Accordingly, the flange back focus adjusting mechanism 11 in the related art CCD camera 1 is designed so as to maintain the balance of the CCD holder 13 in a four-point contact fashion such that the total four ribs 15c of the pair of cam followers 15 equally spaced at 180° from each other in the circumferential direction of the CCD holder 13 are in contact with the cam surfaces 16a, 16b, and 16c of the pair of cams 16 spaced at 180° from each other in the circumferential direction of the adjuster ring 14. However, in actual, the four ribs 15c are not always in contact with the cam surfaces 16a to 16c, but three of the four ribs 15c variably come into contact with the cam surfaces 16a to 16c. In other words, any one of the four ribs 15c is always separate from the cam surfaces 16a to 16c. Accordingly, the CCD holder 13 is minutely vibrated depending on what ribs 15c are used to keep the balance of the CCD holder 13.

The cam surfaces 16a and 16b are formed in gentler slopes for fine adjustment, and the cam surface 16c is a steep slope for coarse adjustment, therefore, the angle of tilt thereof differs from each other. Further, the heights $H_1$ and $H_2$ of the two ribs 15c of each cam follower 15 are set so as to correspond to the angle of tilt of the gentle cam surfaces 16a and 16b. Accordingly, the two ribs 15c are stable on the gentle cam surfaces 16a and 16b, but are not stable on the steep cam surface 16c. Furthermore, when a point 16d between the cam surfaces 16a and 16c or another point 16d between the cam surfaces 16c and 16b comes between the two ribs 15c as shown in FIG. 50B, undue tilt forces are applied to the two cam followers 15, causing an unstable holding condition of the CCD holder 13. The instability of the CCD holder 13 causing vibrations is a serious problem because it immediately causes face vibrations of the CCD 12, which lead to a deterioration in image quality.

SUMMARY OF THE INVENTION

It is accordingly an object of the present invention to provide a video camera which can always stably perform adjustment of the flange back focus of the imaging device.

According to an aspect of the present invention, there is provided in a video camera having a front panel, on which a lens mount is formed and an imaging device thereof is spaced at an adjustable distance from the lens mount along an optical axis, the improvement comprising an adjuster ring provided inside of the front panel so as to be rotatable about the optical axis, for adjusting the adjustable distance, the adjuster ring being formed with three arcuate cams circumferentially equally spaced from each other, an imaging device holder for holding the imaging device, the imaging device holder being formed with three cam followers circumferentially equally spaced from each other, and means for respectively pressing the three cam followers of the imaging device holder onto the three arcuate cams of the adjuster ring along the optical axis.

With this configuration, the cam followers of the imaging device holder can always be kept in pressure contact with the cams of the adjuster ring at three points by the pressing means, so that the balance of the imaging device holder can be maintained always stably. That is, the cam followers of the imaging device holder are always kept in contact with the cams of the adjuster ring at three points to thereby maintain the balance of the imaging device holder always stably. Accordingly, the imaging device held in the imaging device holder can always be balanced to thereby provide an always stable image without face vibrations or the like, thus improving the reliability of the video camera.

According to another aspect of the present invention, there is provided in a video camera having a front panel, on which a lens mount is formed and an imaging device is spaced at an adjustable distance from the lens mount along an optical axis, the improvement comprising a cylindrical portion formed inside of the front panel so as to extend coaxially with the optical axis, the cylindrical portion being formed with three guide slots circumferentially equally spaced from each other and extending parallel to the optical axis, an adjuster ring rotatably mounted on the outer circumference of the cylindrical portion for adjusting the adjustable distance, three arcuate cams formed at the outer circumference of the cylindrical portion on one side surface of the adjuster ring opposed to the front panel and circumferentially equally spaced from each other, the three arcuate cams being rotatable on the outer circumference of the cylindrical portion about the optical axis, an imaging device holder for holding the imaging device, the imaging device holder being inserted in the cylindrical portion so as to be movable along the optical axis, three cam followers formed on the outer circumference of the imaging device holder and respectively inserted in the three guide slots of the cylindrical portion so as to be movable along the optical axis, the cam followers also serve for receiving springs, and three springs interposed between the front panel and the three cam followers of the imaging device holder for respectively pressing the three cam followers on the three arcuate cams of the adjuster ring along the optical axis.

With this arrangement, the three cam followers formed on the outer circumference of the imaging device holder are inserted in the three guide slots of the cylindrical portion of the front panel, and the three arcuate cams of the adjuster ring are fitted with the outer circumference of the cylindrical portion. The three cam followers of the imaging device holder are kept in pressure contact with the three cams of the adjuster ring by the three springs, respectively. Accordingly, the three cam followers can be stably pressed on the three cams by the three springs at three points, thereby maintaining the balance of the imaging device always stably.

Preferably, each of the three cam followers comprises a spring seat extending radially from the outer circumference of the imaging device holder in perpendicular relationship with the optical axis for receiving one end of the corresponding spring, a spring retainer formed on one side surface of the spring seat at a substantially central portion thereof for engaging the one end of the corresponding spring, and a single cam following rib formed on the other side surface of the spring seat at a substantially central portion thereof so as to extend radially for making contact with the corresponding arcuate cam.

With this arrangement, each cam follower includes the spring seat, the spring retainer, and the single cam following rib. Accordingly, the biasing force of each spring can be stably transmitted to the cam following rib of the corresponding cam follower, so that the imaging device holder can stably be pressed onto the three cams at the respective three cam following ribs. Moreover, each cam follower can smoothly follow the corresponding cam at its all portions including a gentler cam surface, a steep cam surface, and a change point therebetween, thereby stably maintaining the balance of the imaging device.

Other objects and features of the invention will be more fully understood from the following detailed description and appended claims when taken with the accompanying drawings.

BRIEF DESCRIPTION OF THE DRAWINGS

FIGS. 48A, 48B, 48C, 48D, and 48E are a front elevation, a rear elevation, a top plan view, a bottom plan view, and a side view of a lock member for locking the adjuster ring, respectively;

FIGS. 49A and 49B are a front elevation and a side view of a cam follower of the CCD holder in the related art, respectively;

DETAILED DESCRIPTION OF THE PREFERRED EMBODIMENTS

Figure 51:
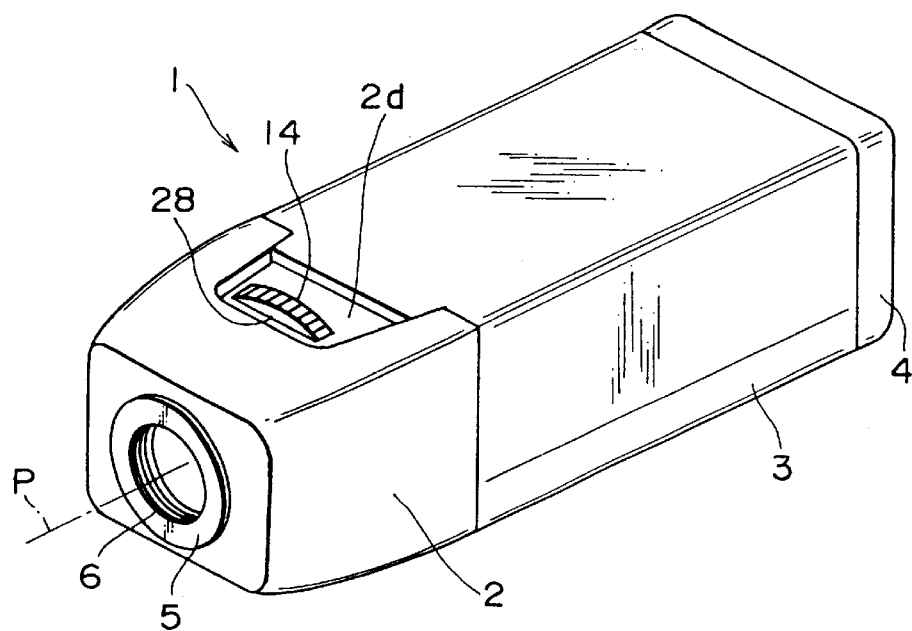
FIG. 51 is a perspective view of the CCD camera in the related art as viewed from the front side thereof.
Figure 52:
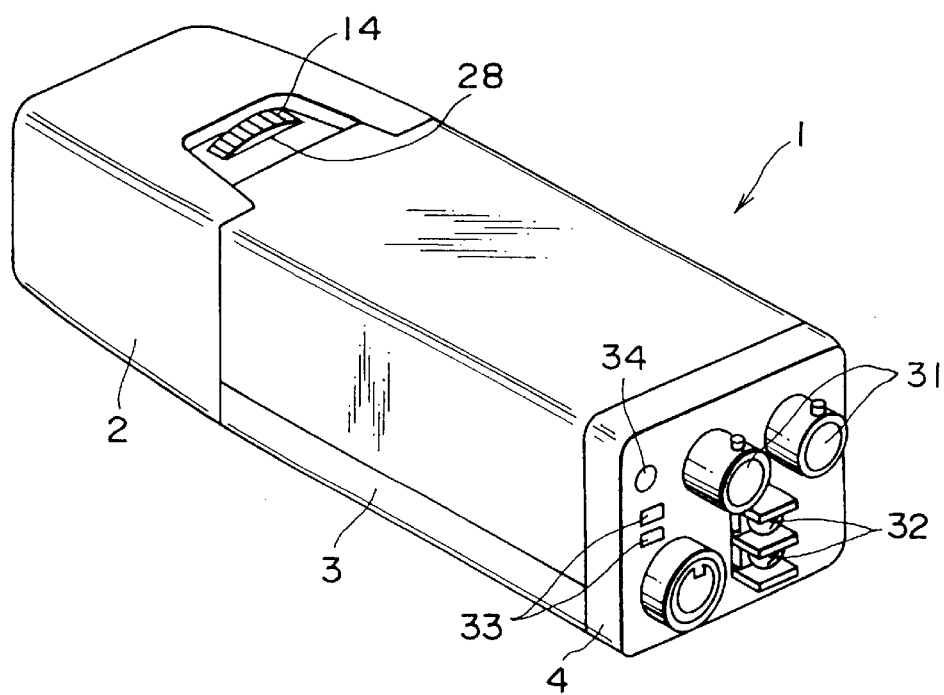
FIG. 52 is a perspective view of the CCD camera in the related art as viewed from the rear side thereof.

A preferred embodiment of the present invention applied to a CCD camera will now be described in the following order with reference to the drawings. In the following description, the same structural parts as those in the related art shown mainly in FIGS. 51 to 53 will be denoted by the same reference numerals, and the description thereof will be omitted to avoid repetition.

(1) Description of Exterior Parts of CCD Camera
(2) Description of Camera Case
(3) Description on Conduction of Camera Case
(4) Description of Front Panel
(5) Description of Connector and Terminal Strips
(6) Description of Flange Back Focus Adjusting Mechanism
(7) Description of Lock Member (1) Description of Exterior Parts of CCD Camera As shown in FIGS. 1 to 14, the exterior of the CCD camera denoted generally by reference numeral 1 is composed of three separate parts, i.e., a front panel 2, a camera case 3, and a rear panel 4. The front panel 2 is composed of a front panel chassis 2A and a front panel cover 2B covering the front panel chassis 2A. The front panel chassis 2A is formed by die casting such as aluminum die casting, and the front panel cover 2B is formed by molding of a synthetic resin or the like. The camera case 3 is composed of an upper camera case 3A and a lower camera case 3B each formed from a sheet metal which is a painted rigid sheet to be hereinafter described. The rear panel 4 is a one-piece component formed by molding. The front panel chassis 2A of the front panel 2 is integrally formed with a lens mount 5 having a lens mounting portion 6. The front panel chassis 2A and the front panel cover 2B are detachably connected with each other by engagement of lugs and stops to be hereinafter described. The upper camera case 3A and the lower camera case 3B of the camera case 3 are detachably connected with each other at their lower portions by means of a pair of front lower screws 44 and a pair of rear lower screws 45. The upper camera case 3A is detachably connected at its front upper portion to a rear end portion of the front panel chassis 2A by means of a pair of front upper screws 46. The rear panel 4 is detachably connected at its right and left side portions to a rear end portion of the upper camera case 3A by means of a pair of side screws 47.

The front panel 2 is formed at its upper and lower portions with a pair of recesses 51, and the camera case 3 is also formed at its upper and lower portions with a pair of recesses 51 adjacent to the upper and lower recesses 51 of the front panel 2. The bottom walls of the upper and lower recesses 51 of the front panel 2 and the camera case 3 are formed at their joint portions with a pair of upper and lower slits 28 perpendicular to an optical axis P. An adjuster ring 14 is exposed at its upper and lower portions through the upper and lower slits 28. A lens connector 52 and a switch 53 for AUTO-IRIS or the like are provided on one side surface of the camera case 3. Further, there are provided on the rear panel 4 a BNC connector 31 for inputting and outputting a video signal, two terminal strips 32, a switch 33 for CCD-IRIS or the like, a plurality of volumes 34, and a grounding screw 38. As shown by phantom lines in FIGS. 3 and 4, a camera stand 54 is detachably mounted on the upper surface or the lower surface of the camera case 3 by the screws 46.

(2) Description of Camera Case

As shown in FIGS. 7 to 21, the upper camera case 3A of the camera case 3 as one of the exterior parts of the CCD camera 1 is formed by pressing a sheet metal. The upper camera case 3A has a substantially rectangular prismatic shape consisting of an upper wall portion $3A_1$, a pair of right and left side wall portions $3A_2$, and a pair of right and left lower wall portions $3A_3$. An opening $3A_4$ extending parallel to the optical axis P is defined between the right and left lower wall portions $3A_3$. On the other hand, the lower camera case 3B of the camera case 3 as one of the exterior parts of the CCD camera 1 is also formed by pressing a sheet metal. The lower camera case 3B is composed of a lower wall portion $3B_1$, a pair of right and left step portions $3B_2$ raised from the right and left side edges of the lower wall portion $3B_1$ by an amount equivalent to the wall thickness thereof and extending horizontally, and a pair of right and left camera chassis 3C as a chassis structure vertically rising from the right and left side edges of the right and left step portions $3B_2$ and extending parallel to the optical axis P.

A PS board 61 and a PR board 62 of printed circuit boards for a signal processing system are detachably mounted on the inside surfaces of the right and left camera chassis 3C so as to extend parallel to the optical axis P. Further, a CT board 63 which is a connector board composed of a printed circuit board is detachably mounted on the rear ends of the right and left camera chassis 3C so as to extend in a direction at right angles to the optical axis P. In mounting the PS board 61 and the PR board 62 to the right and left camera chassis 3C, rear ends 61a and 62a of the PS board 61 and the PR board 62 are inserted into slits 65 formed in horizontal tabs 64 inwardly bent from the rear end portions of the right and left camera chassis 3C. In this positioned condition, lower ends 61b and 62b of the PS board 61 and the PR board 62 are further positioned by a plurality of positioning projections 66 formed by cutting the right and left step portions $3B_2$ of the lower camera case 3B. In this positioned condition, front ends 61c and 62c of the PS board 61 and the PR board 62 are detachably mounted to mounting portions 67 formed at the front end portions of the right and left camera chassis 3C by means of two screws 68. However, the mounting portion 67 for the PR board 62 is formed in a connector retainer plate 69 formed by pressing a sheet metal. The connector retainer plate 69 is secured to the left camera chassis 3C by means of two screws 70. The connector retainer plate 69 is formed with a projection 71 for positioning the PR board 62. The lens connector 52 and the switch 53 are mounted on an outer side surface of the PR board 62, and the lens connector 52 is supported by the connector retainer plate 69. By assembling the upper camera case 3A to the outer surfaces of the lower camera case 3B, the lens connector 52 and the switch 53 are exposed to two windows 72 formed through the left side wall portion $3A_2$ of the upper camera case 3A. A lower end 63a of the CT board 63 is inserted into a slit 74 formed in a vertical projection 73 rising from the right step portion $3B_2$ of the lower camera case 3B. In this positioned condition, an upper end 63b of the CT board 63 is detachably mounted to a pair of mounting portions 76 formed at the rear ends of the right and left camera chassis 3C, by means of two screws 75.

After mounting the PS board 61, the PR board 62, and the CT board 63 on the right and left camera chassis 3C as mentioned above, the upper camera case 3A is fitted to the outside surface of the lower camera case 3B in a direction parallel to the optical axis P, so that the right and left lower wall portions $3A_3$ of the upper camera case 3A are fitted with the lower surfaces of the right and left step portions $3B_2$ of the lower camera case 3B. In this condition, the upper camera case 3A and the lower camera case 3B are secured to each other, thus completing the assembly of the camera case 3. In this assembled condition, the right and left camera chassis 3C of the lower camera case 3B can be fully covered with the upper camera case 3A, so that many structural portions (e.g., mounting portions, slits, and holes) formed in the camera chassis 3C for supporting the PS board 61, the PR board 62, and the CT board 63 can be completely concealed. Accordingly, the entire outer surface of the upper camera case 3A and the outer surface of the lower wall portion $3B_1$ of the lower camera case 3B between the right and left step portions $3B_2$ become an appearance surface exposed to the outside of the camera case 3. Further, the right and left camera chassis 3C are no longer necessary to be bound as the exterior parts, but can perform the function of the chassis structure.

From a structural viewpoint, the lower camera case 3B has high strength and high rigidity because of bending of the right and left step portions $3B_2$ from the lower wall portion $3B_1$ of the lower camera case 3B and bending of the right and left camera chassis 3C, so that the lower camera case 3B serves as a framework of the camera case 3. In the condition that the right and left lower wall portions $3A_3$ of the upper camera case 3A fitted to the outside surface of the lower camera case 3B are fitted to the lower surfaces of the right and left step portions $3B_2$ of the lower camera case 3B, the right and left lower wall portions $3A_3$ and the right and left step portions $3B_2$ are secured together at their front and rear end portions by the screws 44 and 45, thereby ensuring the high strength and high rigidity of the camera case 3 although it has a substantially chassisless structure. The front end portion of the camera case 3 is detachably connected at its upper and lower portions to a pair of upper mounting portions 78 and a pair of lower mounting portions 77 formed at the four corners of the rear end portion of the front panel chassis 2A of the front panel 2, by means of the upper two screws 46 and the lower two screws 44.

The BNC connector 31, the two terminal strips 32, the switch 33, and the volumes 34 are mounted on the rear surface of the CT board 63, and the rear panel 4 is formed with a plurality of windows 81 for exposing these parts 31 to 34 and the grounding screw 38. Further, the right and left side edges of the front surface of the rear panel 4 are integrally formed with a pair of right and left projections 82 having holes for insertion of screws. The upper edge of the front surface facing to the inside of the rear panel 4 is integrally formed with a pair of right and left projections 84 each having an upward projecting dowel 83. The lower edge of the front surface of the rear panel 4 is integrally formed with a pair of right and left insertion guide ribs 85. The projections 82, the projections 84, and the ribs 85 of the rear panel 4 are fitted to the inside surface of the rear end portion of the camera case 3, and the dowels 83 of the projections 84 are engaged into a pair of right and left dowel holes 86 formed at the rear end portion of the upper wall portion $3A_1$ of the upper camera case 3A, thus positioning the rear panel 4 to the camera case 3. In this positioned condition, the two screws 47 are inserted through two holes formed at the rear end portions of the right and left side portions $3A_2$ of the upper camera case 3A and through the holes of the projections 82 of the rear panel 4, and are screwed into a pair of right and left mounting portions 87 formed integrally at the rear ends of the right and left camera chassis 3C, thus detachably mounting the rear panel 4 onto the rear end of the camera case 3. In this mounted condition, all of the BNC connector 31, the terminal strips 32, the switch 33, and the volumes 34 mounted on the CT board 63 are exposed to the windows 81 of the rear panel 4. The grounding screw 38 is screwed into a mounting portion 88 formed integrally at the rear end of the left camera chassis 3C, and is exposed to one of the windows 81.

(3) Description on Conduction of Camera Case

Figure 23A:
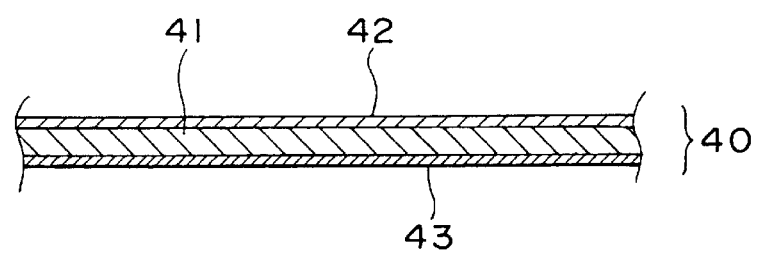
FIGS. 23A and 23B are enlarged sectional views of the CCD camera for illustrating nonconduction due to the contact of two painted rigid sheets.

As shown in FIG. 23A, a painted rigid sheet 40 is used as each of the upper camera case 3A and the lower camera case 3B constituting the camera case 3. The painted rigid sheet 40 is composed of a sheet metal 41, a paint layer 42 formed on the upper surface of the sheet metal 41 by applying a paint having a preliminarily specified color, and a coating layer 43 formed on the lower surface of the sheet metal 41. Accordingly, it is unnecessary to perform any other treatments for rust resistance and appearance after pressing the sheet metal 41, so that the painted rigid sheet 40 has a great advantage in cost. In general, however, the coating layer 43 is conductive to the sheet metal 41, but the paint layer 42 is nonconductive to the sheet metal 41 because an insulating material is contained in the paint used to form the paint layer 42.

Figure 23B:
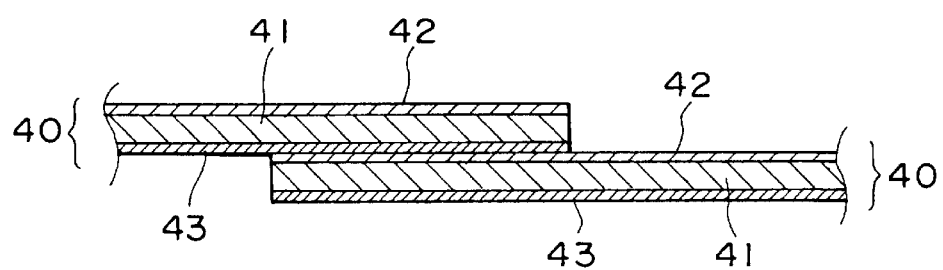

Accordingly, when two painted rigid sheets 40 are overlaid with same side of surface on top as shown in FIG. 23B, the coating layer 43 of the upper painted rigid sheet 40 comes into contact with the paint layer 42 of the lower painted rigid sheet 40. That is, the nonconductive paint layer 42 is interposed between the conductive sheet metals 41 of these two painted rigid sheets 40, so that conduction between these two painted rigid sheets 40 cannot be ensured.

As shown in FIGS. 15 to 18, the whole outer surface of the upper camera case 3A and a part of the outer surface of the lower camera case 3B become an appearance surface in the assembled condition. Accordingly, the paint layer 42 of the painted rigid sheet 40 becomes the outside surface of each of the upper camera case 3A and the lower camera case 3B, forming an appearance surface, whereas the coating layer 43 becomes the inside surface of each of the upper camera case 3A and the lower camera case 3B.

Figure 24A:
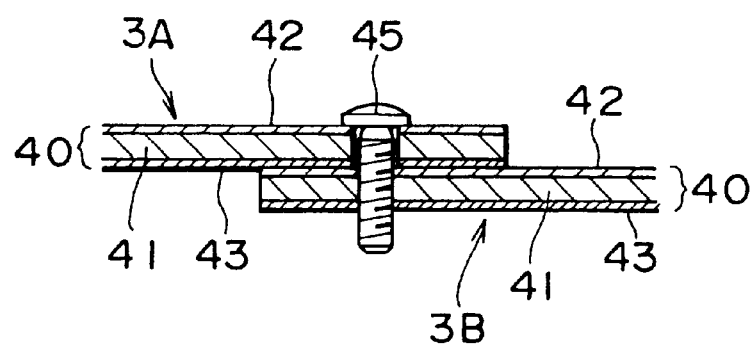
FIGS. 24A and 24B are enlarged sectional views of the CCD camera for illustrating nonconduction due to the connection of two painted rigid sheets by means of a screw.
Figure 24B:
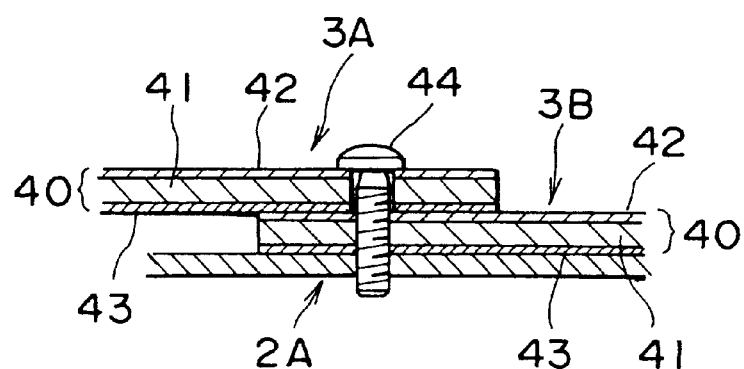
Figure 25:
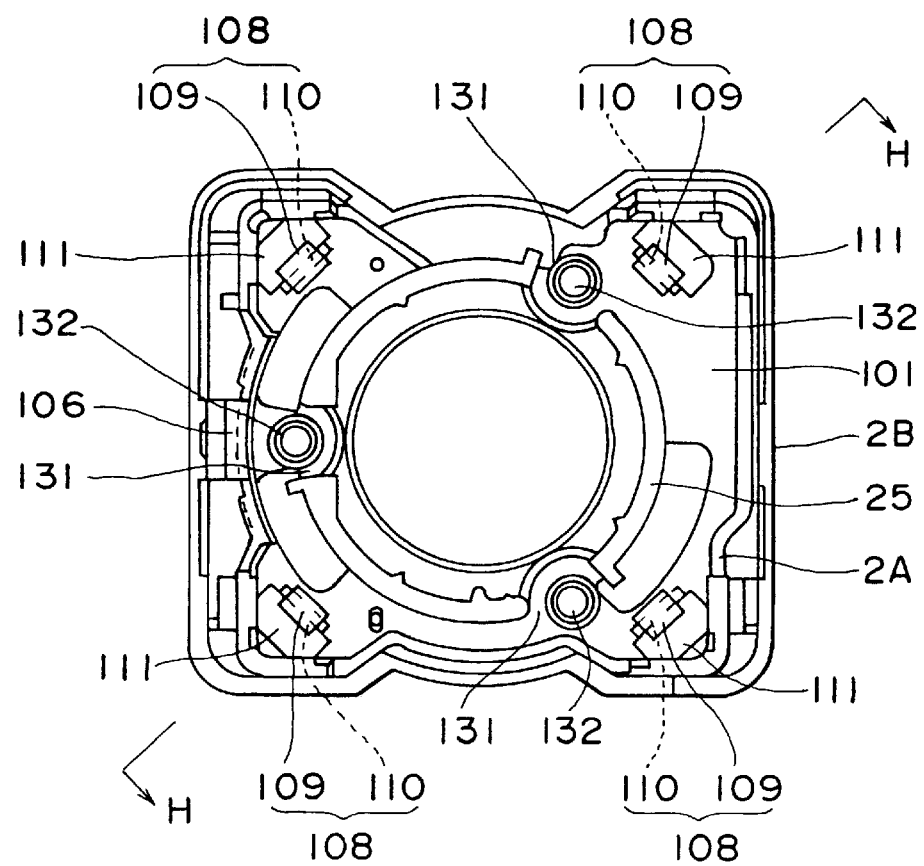
FIG. 25 is a rear view of the CCD camera for illustrating means for connecting the front panel chassis and the front panel cover of the front panel of the CCD camera.
Figure 26:
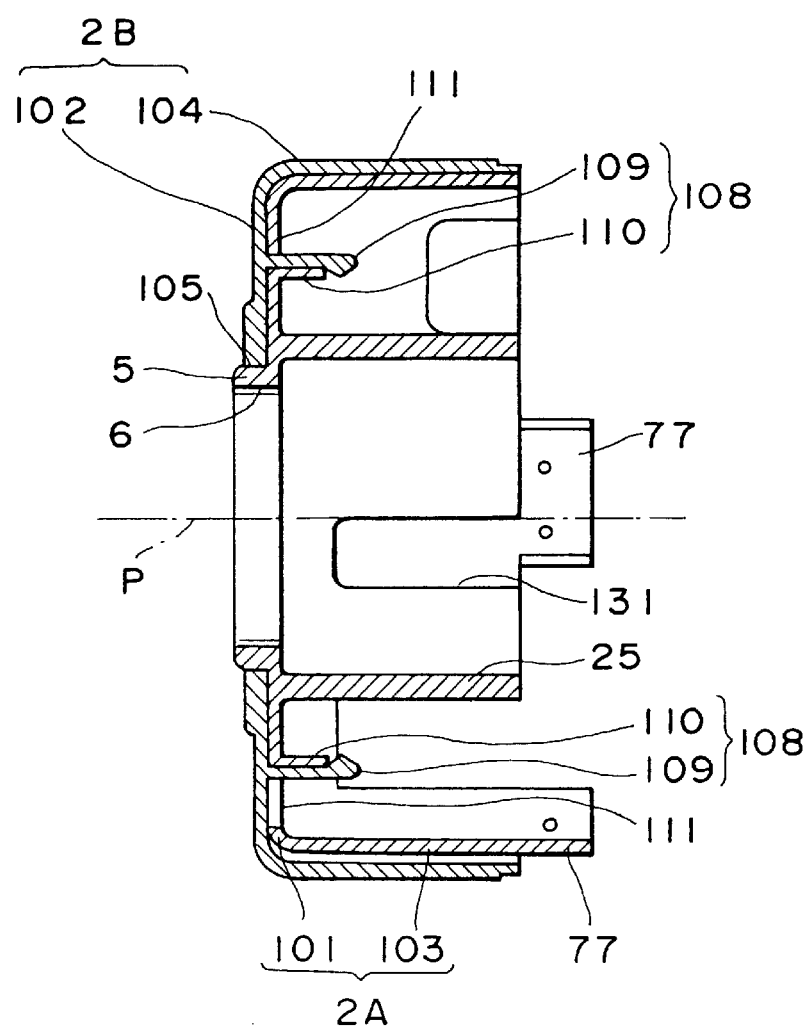
FIG. 26 is a cross sectional view of the CCD camera taken along the line H—H in FIG. 25.

In the case that the upper camera case 3A and the lower camera case 3B each formed from the painted rigid sheet 40 are overlaid and secured together by the screw 45 as shown in FIG. 24A, conduction between the upper camera case 3A and the lower camera case 3B cannot be ensured because of the presence of the nonconductive paint layer 42 interposed between the sheet metals 41 of the two overlaying painted rigid sheets 40. Similarly in an attempt in which the upper camera case 3A, the lower camera case 3B, and the metallic front panel chassis 2A are overlaid and secured together by the screw 44 as shown in FIG. 24B, not only conduction between the upper camera case 3A and the lower camera case 3B, but also conduction between the upper camera case 3A and the front panel chassis 2A cannot be ensured because of the nonconductive paint layer 42.

Figure 1:
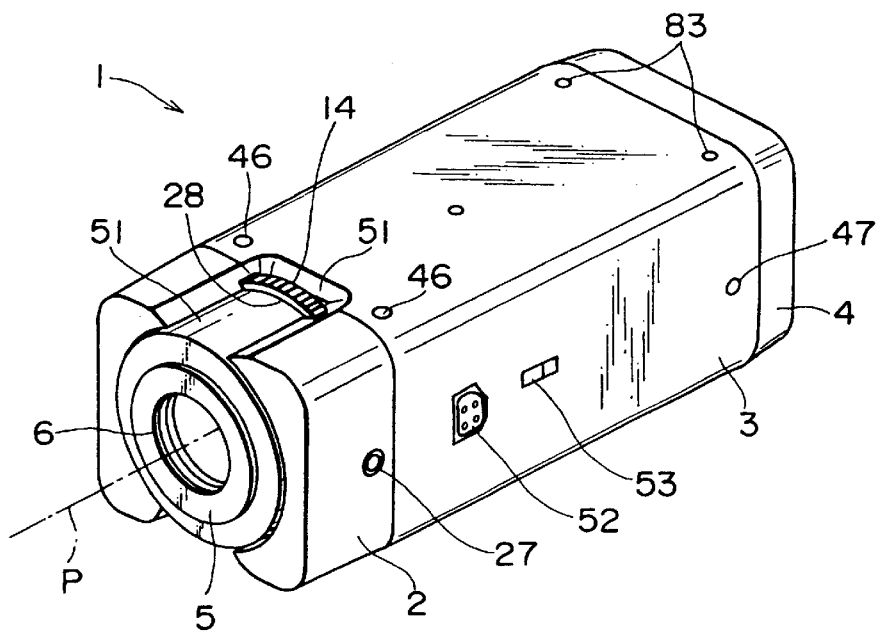
FIG. 1 is a perspective view of a CCD camera according to a preferred embodiment of the present invention, as viewed from the front side of the CCD camera.
Figure 2:
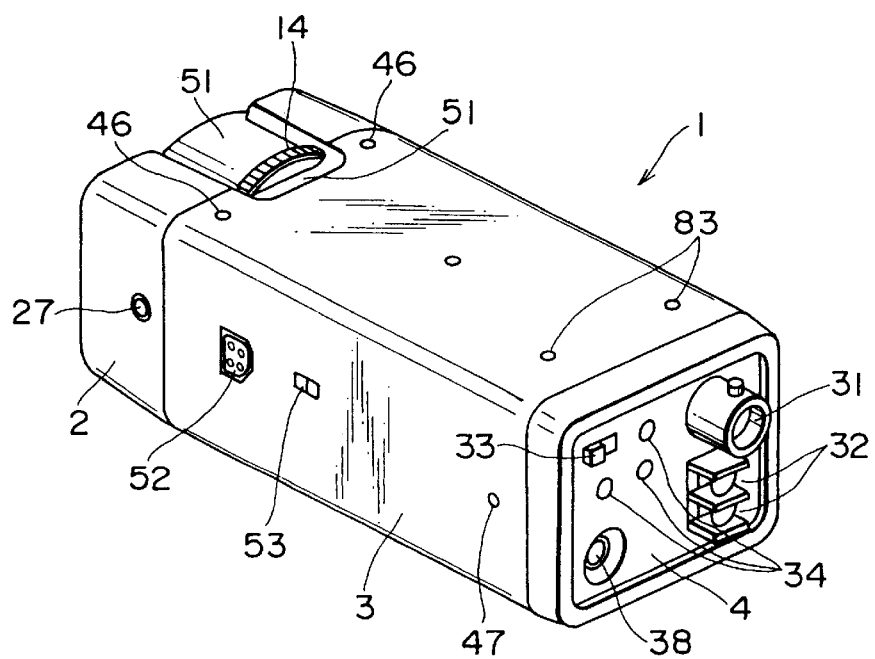
FIG. 2 is a perspective view of the CCD camera as viewed from the rear side thereof.
Figure 3:
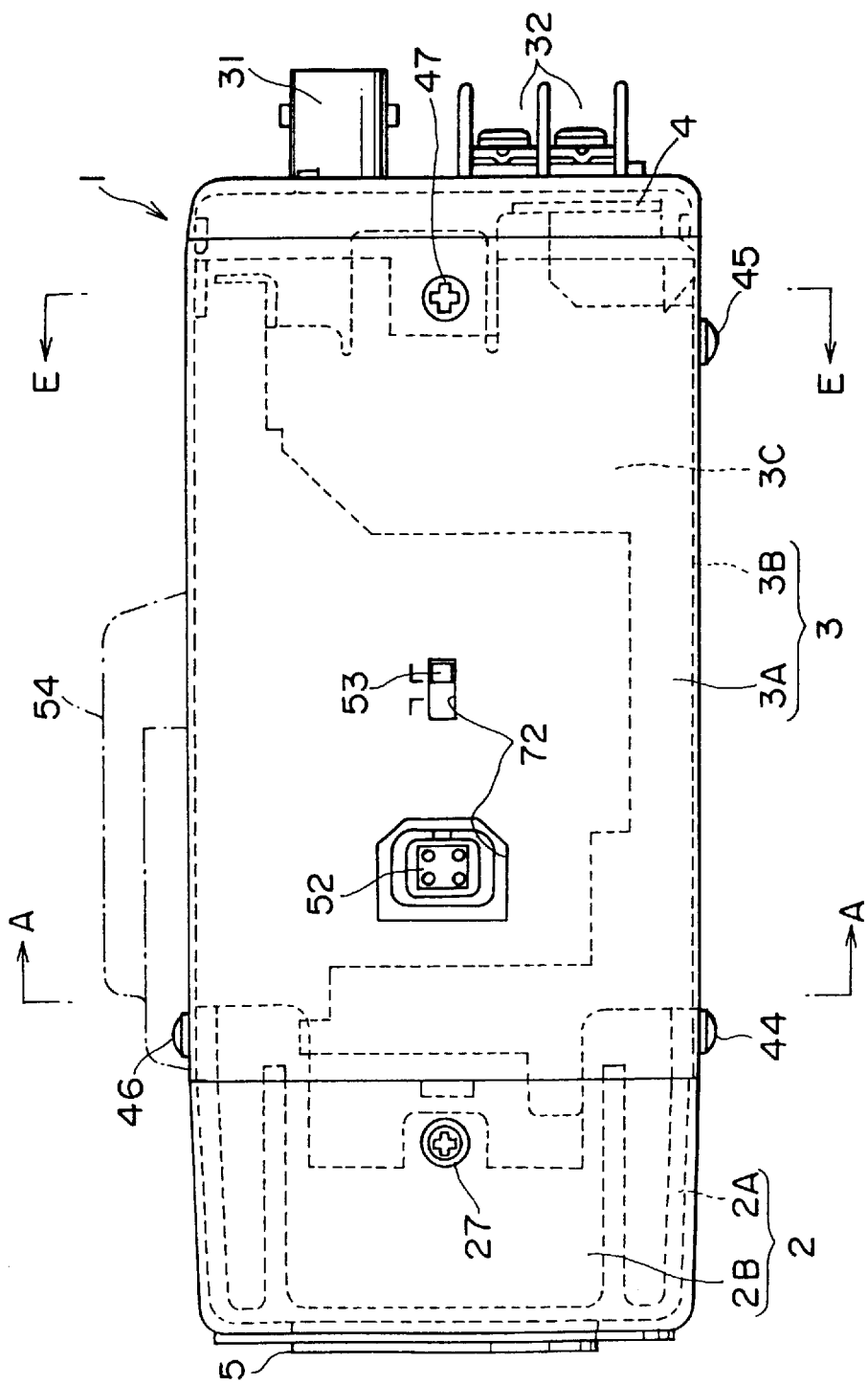
FIG. 3 is a side view of the CCD camera.
Figure 4:
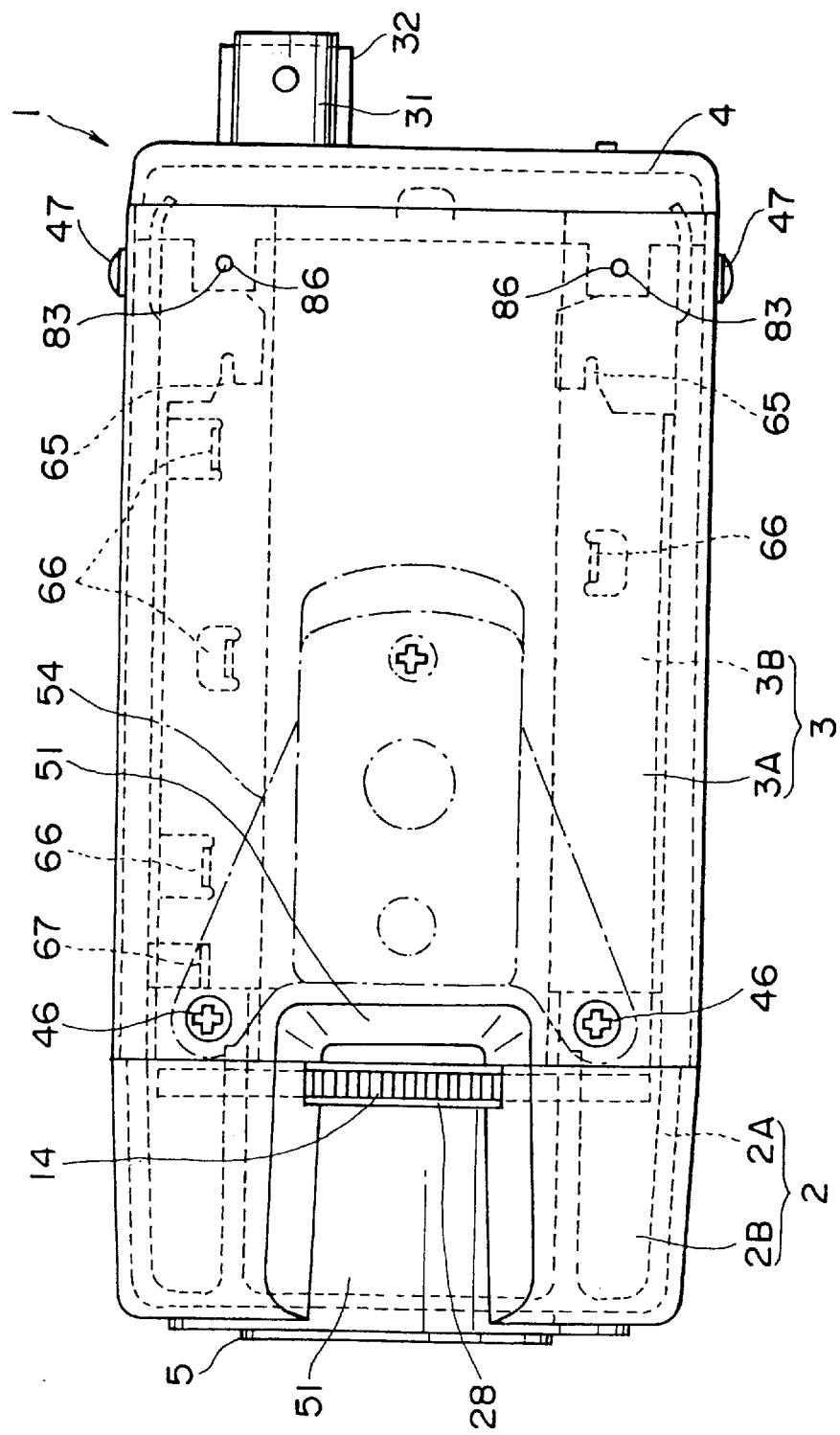
FIG. 4 is a top plan view of the CCD camera.
Figure 5:
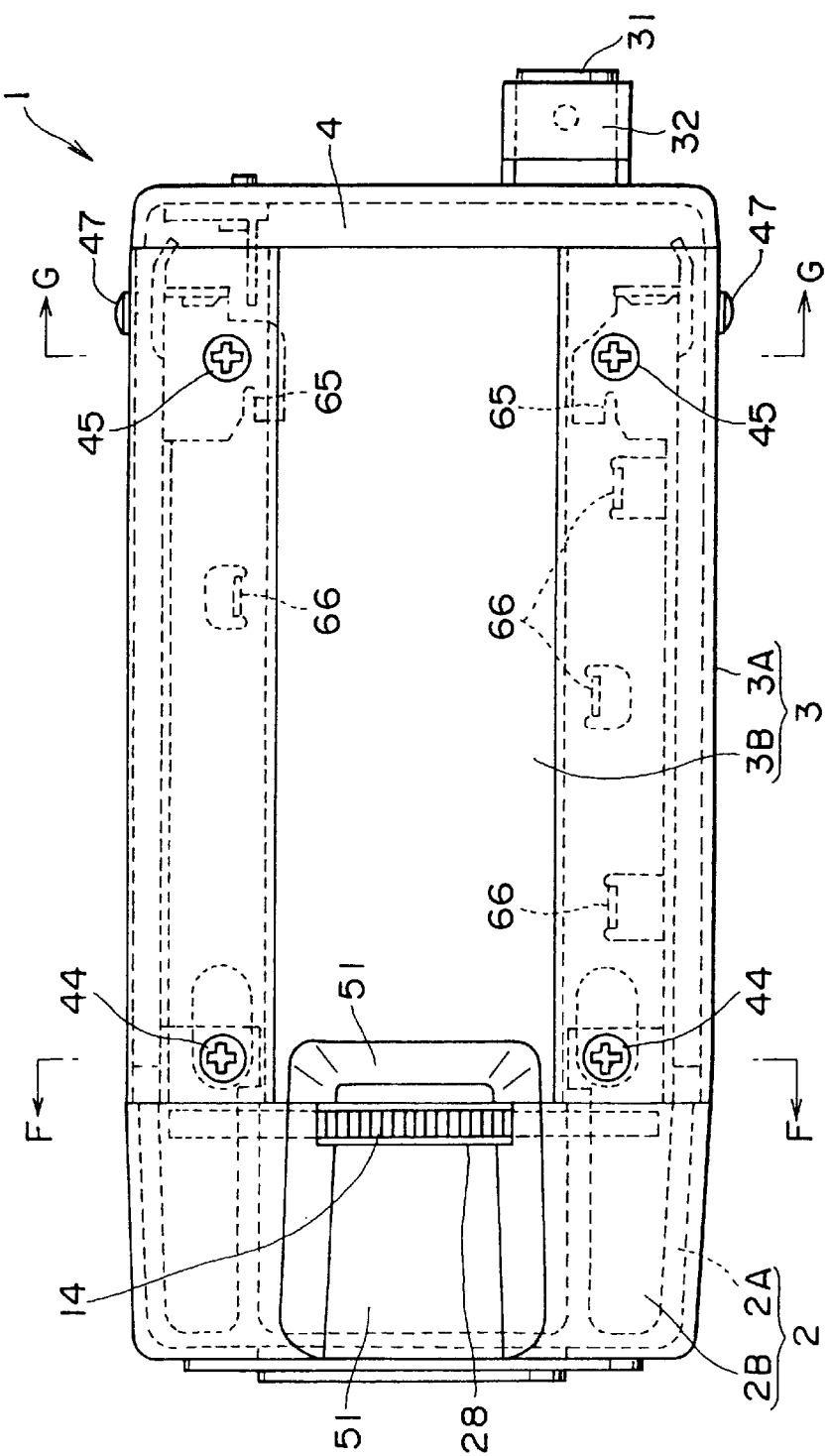
FIG. 5 is a bottom plan view of the CCD camera.
Figure 6:
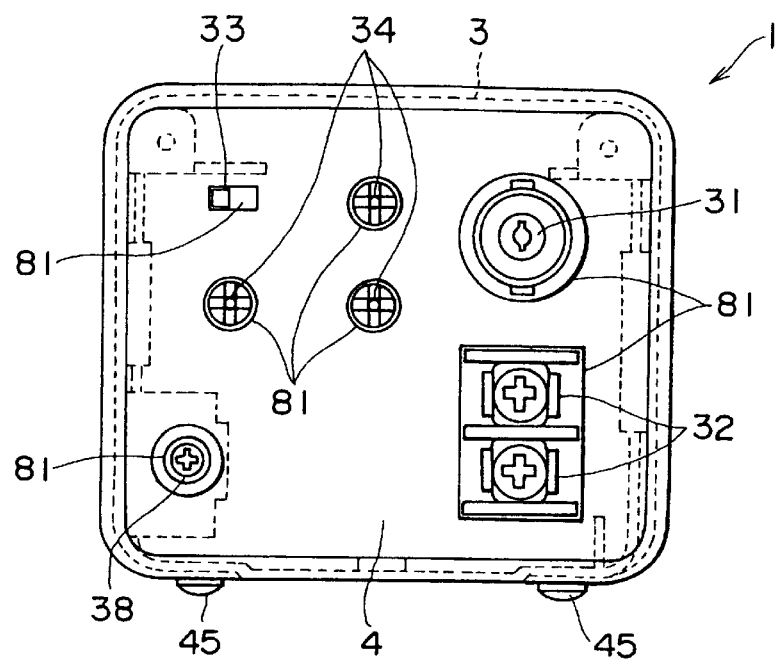
FIG. 6 is a rear view of the CCD camera.
Figure 7:
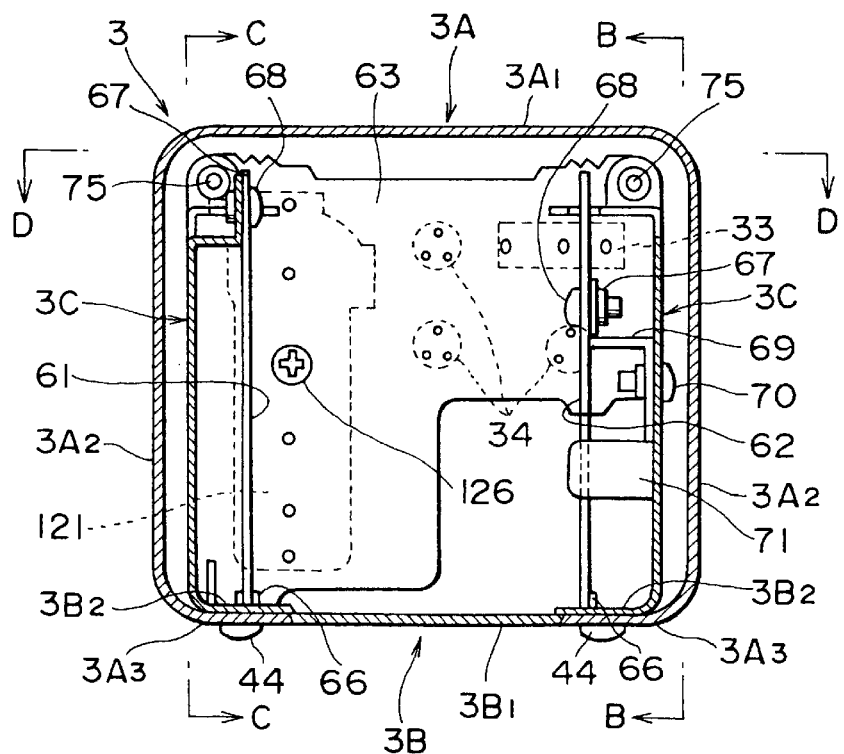
FIG. 7 is a cross sectional view of the CCD camera taken along the line A—A in FIG. 3.
Figure 8:
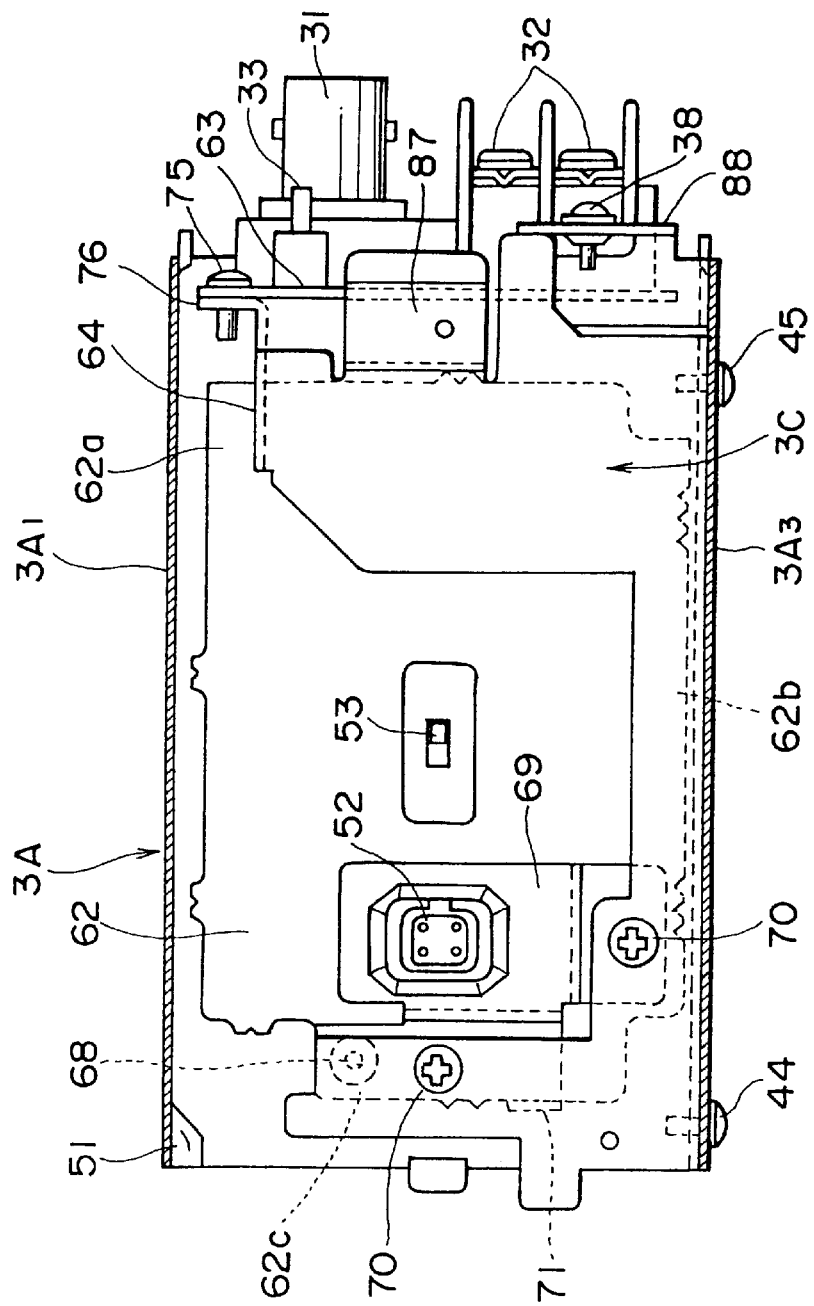
FIG. 8 is a cross sectional view of the CCD camera taken along the line B—B in FIG. 7.
Figure 9:
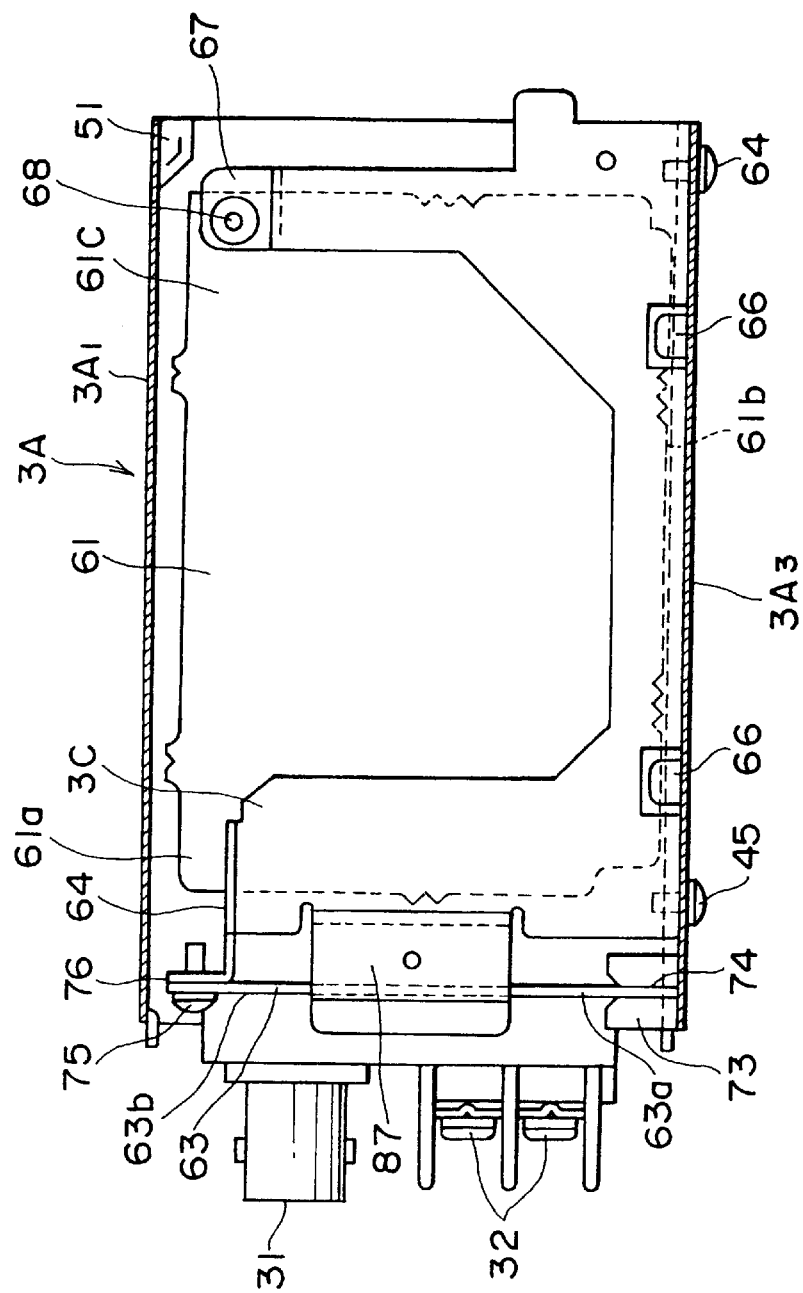
FIG. 9 is a cross sectional view of the CCD camera taken along the line C—C in FIG. 7.
Figure 10:
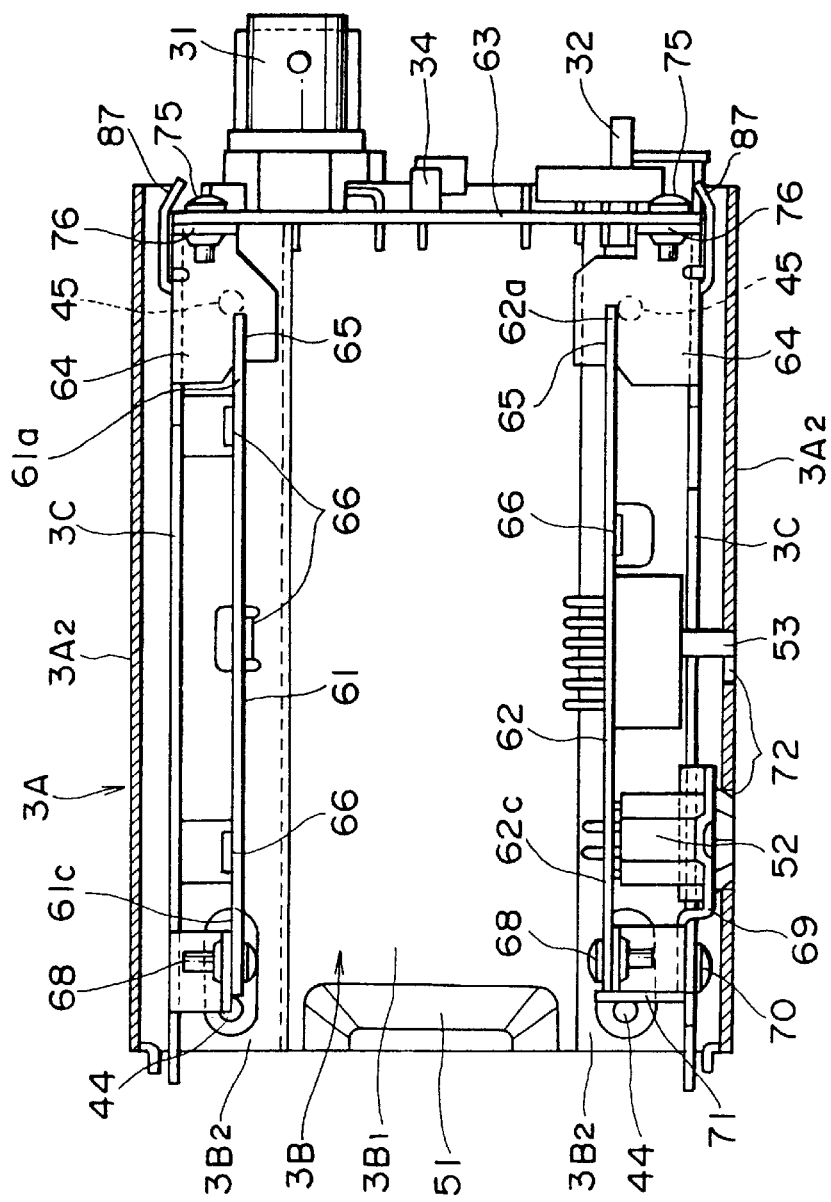
FIG. 10 is a cross sectional view of the CCD camera taken along the line D—D in FIG. 7.
Figure 11:
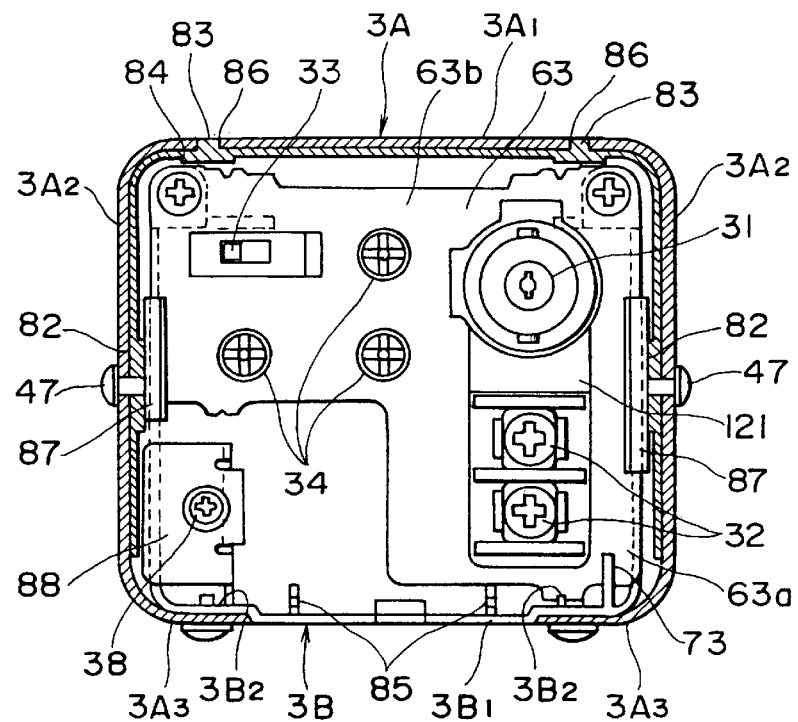
FIG. 11 is a cross sectional view of the CCD camera taken along the line E—E in FIG. 3.
Figure 12:
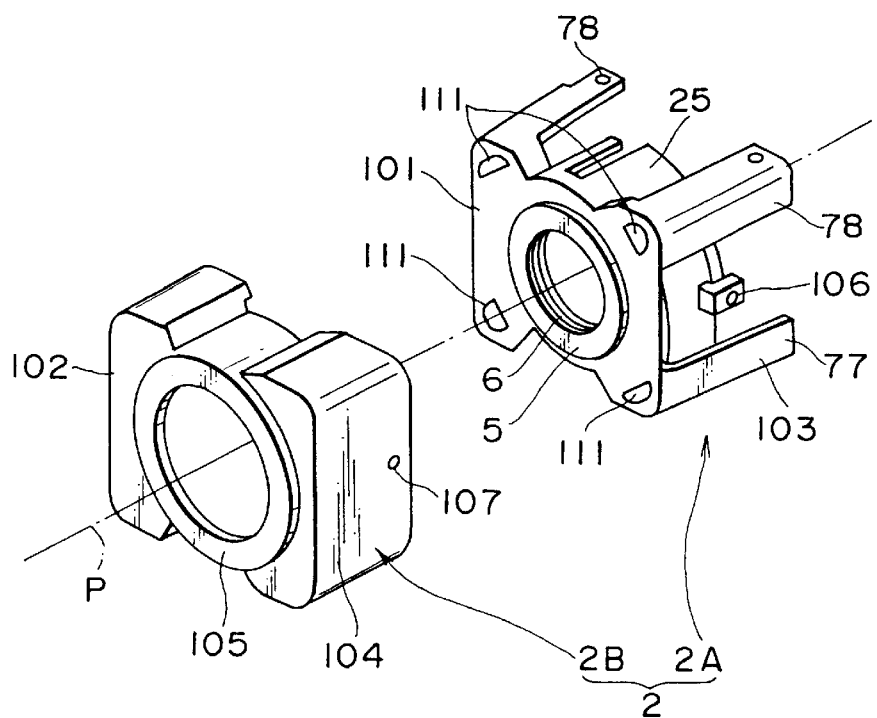
FIG. 12 is an exploded perspective view of a front panel of the CCD camera.
Figure 13:
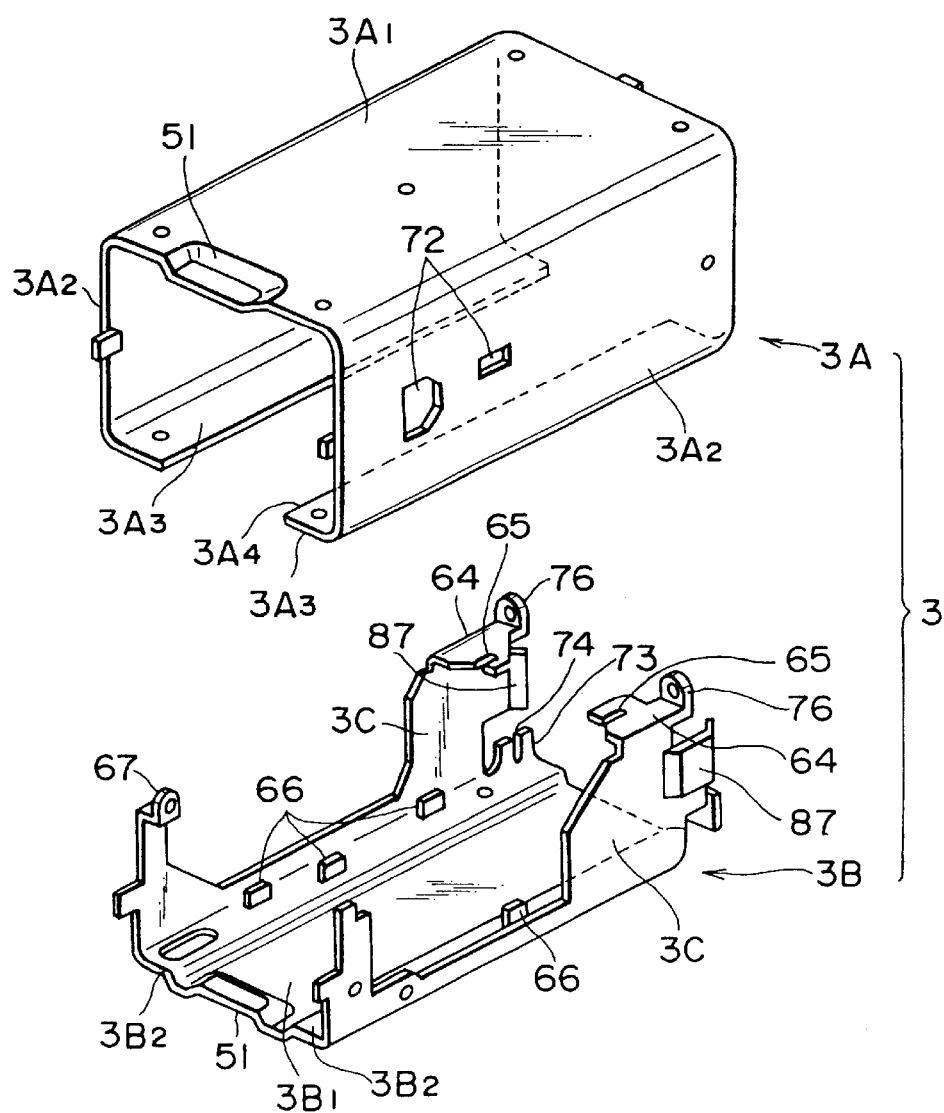
FIG. 13 is an exploded perspective view of a camera case of the CCD camera.
Figure 14:
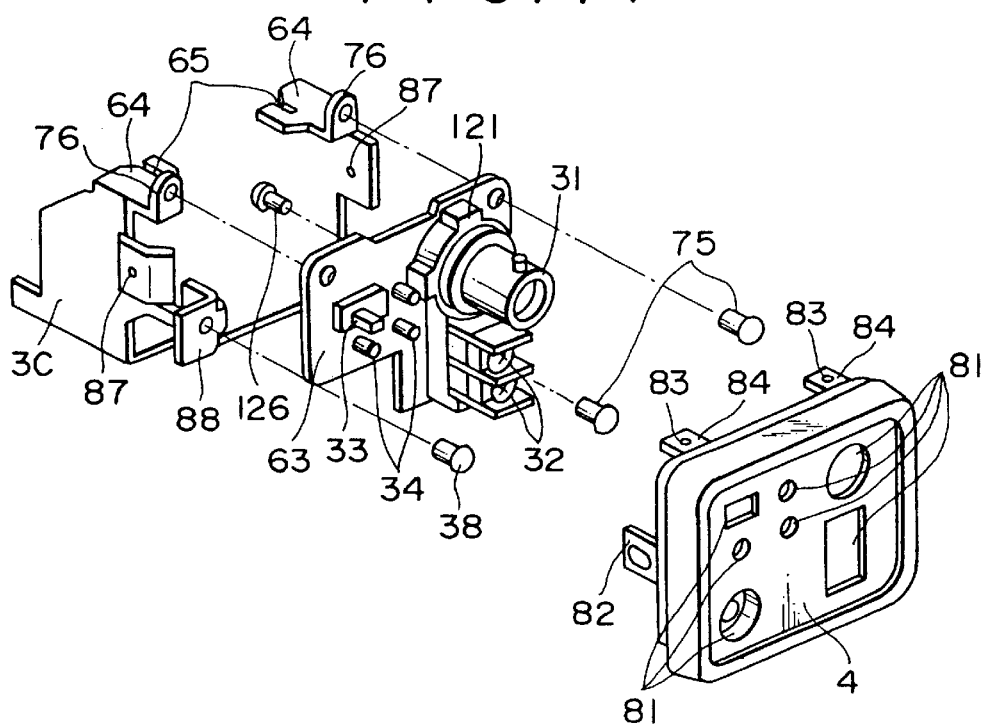
FIG. 14 is an exploded perspective view of a rear panel, a CT board, and camera chassis of the CCD camera.
Figure 15:
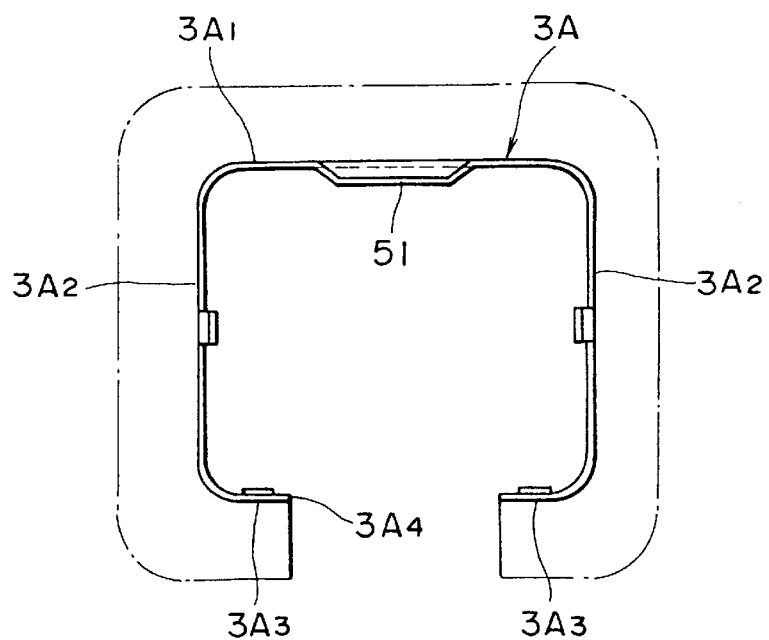
FIG. 15 is a front view of an upper camera case of the CCD camera.
Figure 16A:
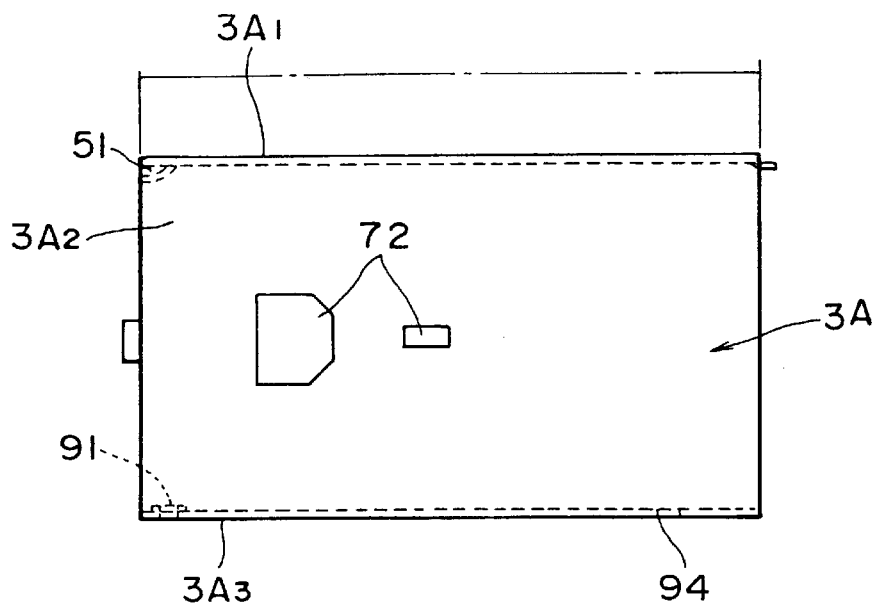
FIGS. 16A and 16B are a side view and a top plan view of the upper camera case of the CCD camera, respectively.
Figure 16B:
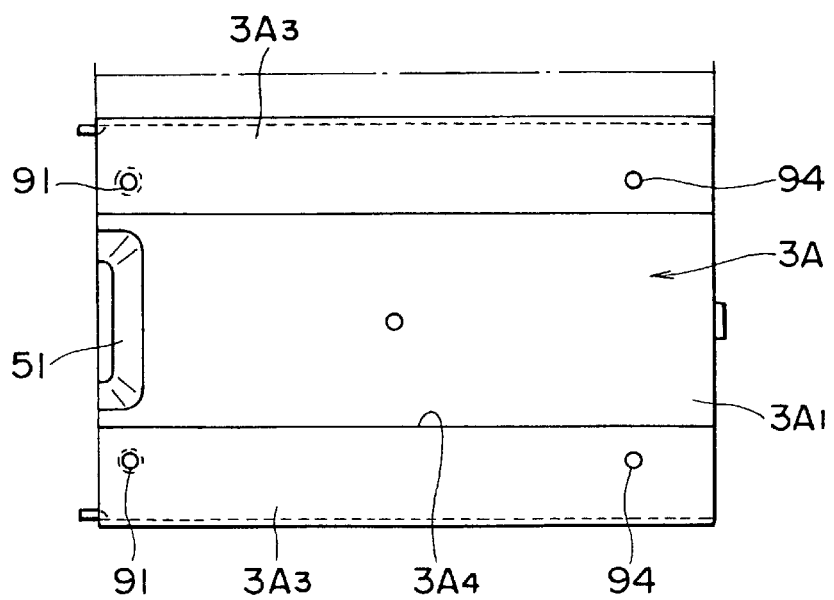
Figure 17:
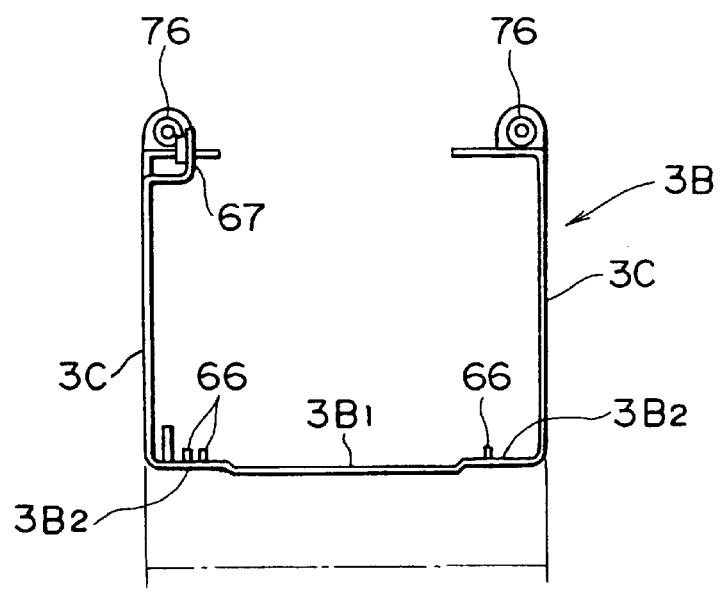
FIG. 17 is a rear view of a lower camera case of the CCD camera.
Figure 18A:
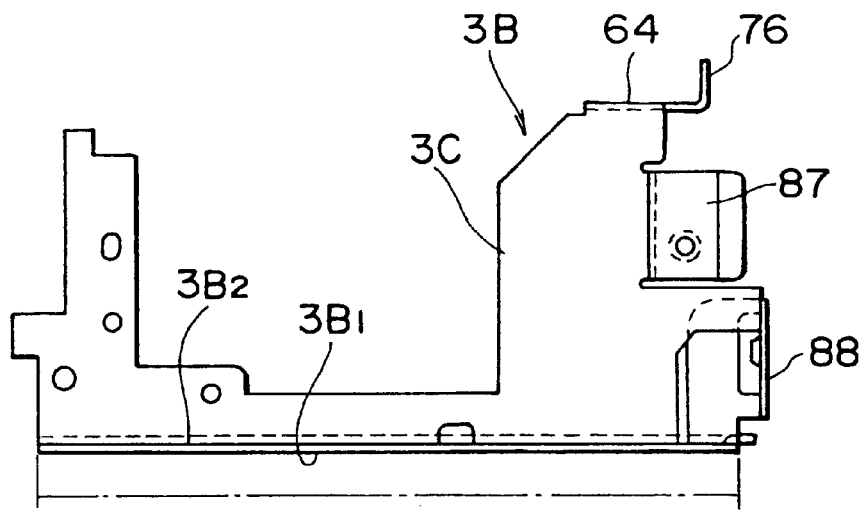
FIGS. 18A and 18B are a side view and a bottom plan view of the lower camera case of the CCD camera, respectively.
Figure 18B:
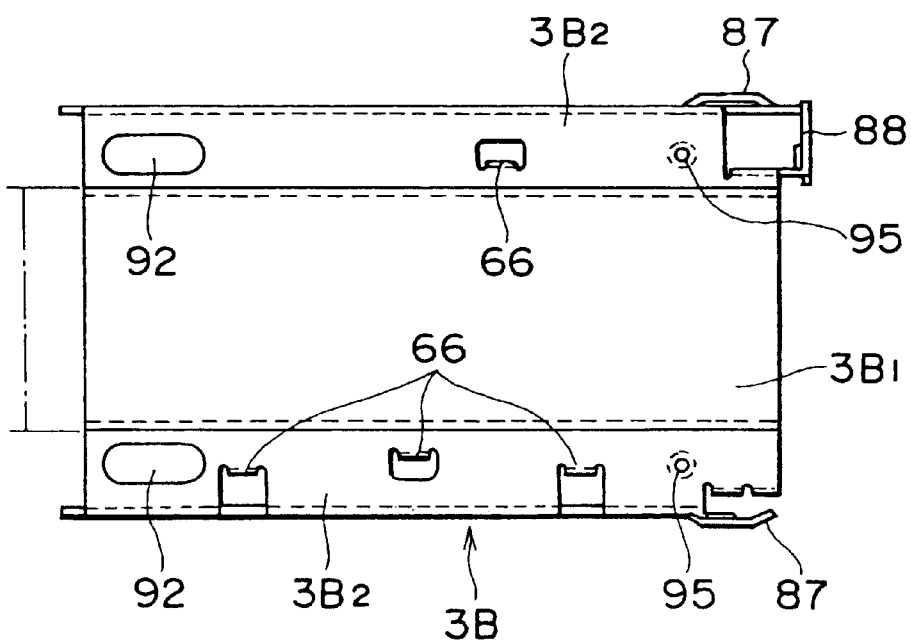
Figure 19:
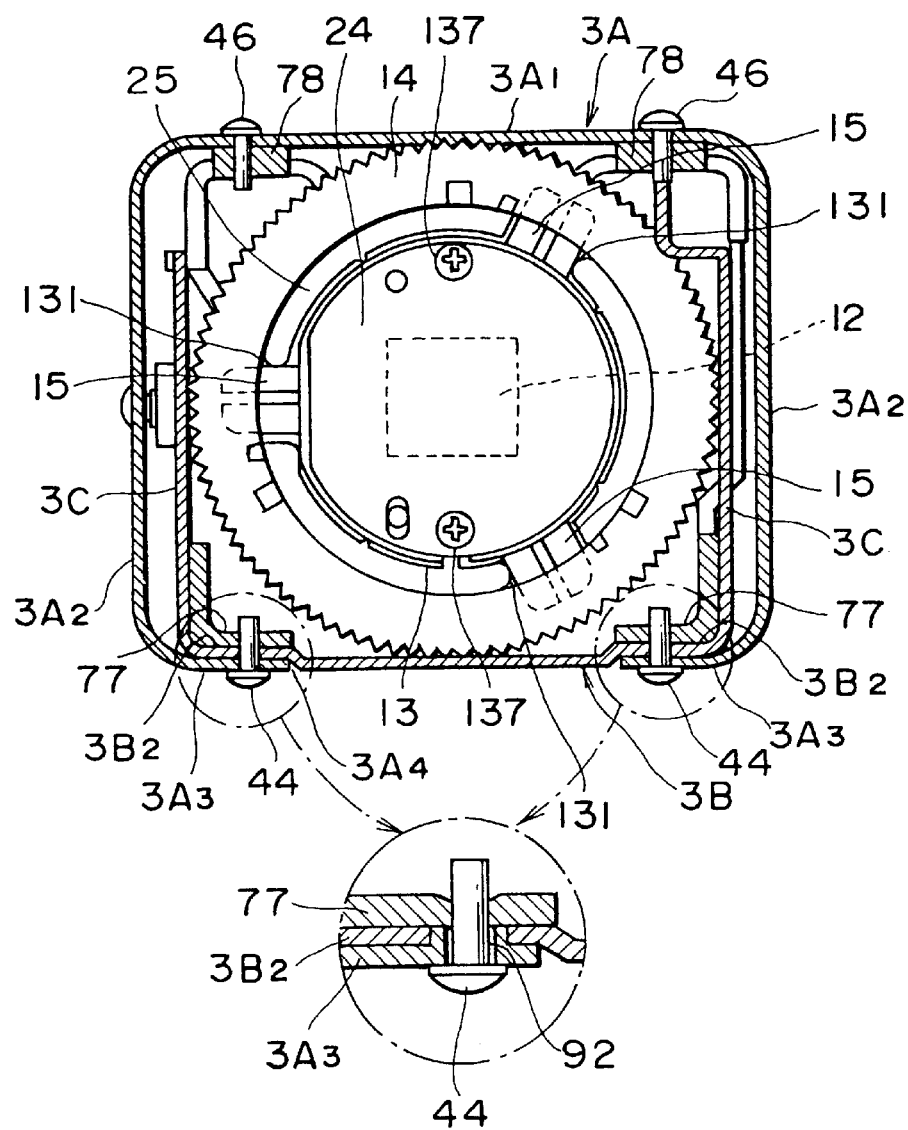
FIG. 19 is a cross sectional view of the CCD camera taken along the line F—F in FIG. 5.
Figure 20A:
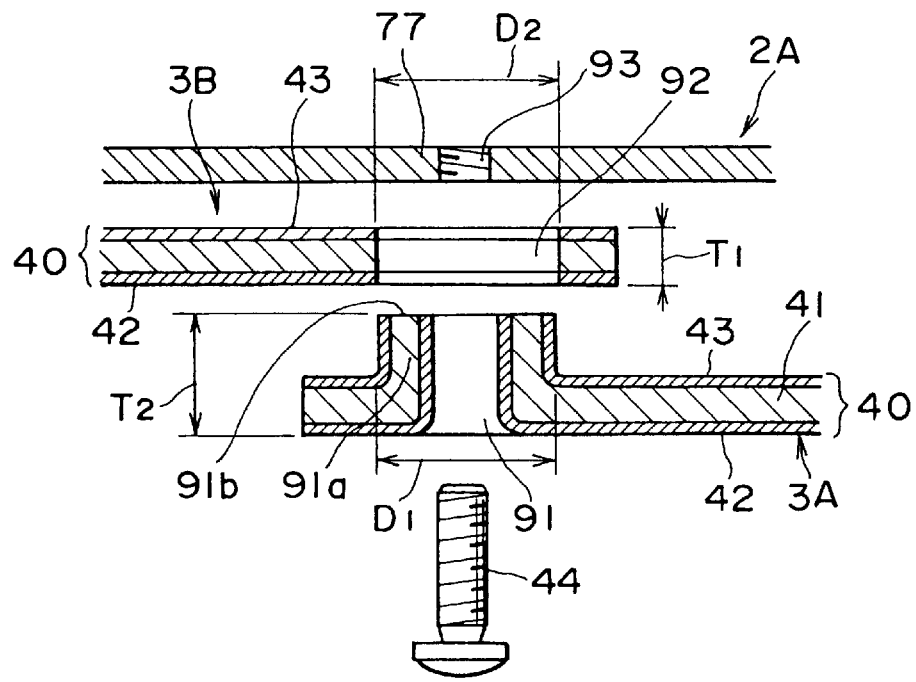
FIGS. 20A and 20B are enlarged sectional views for illustrating the details of fastened portions of the upper camera case and the lower camera case of the CCD camera to a front panel chassis.
Figure 20B:
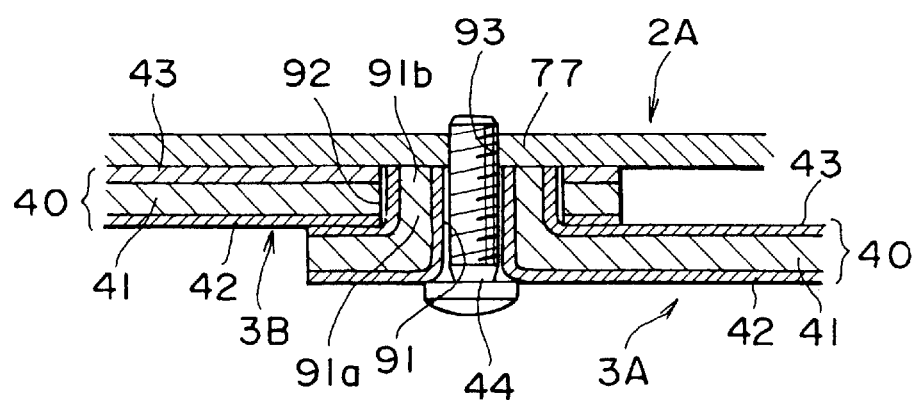

As shown in FIG. 19, the right and left lower wall portions $3A_3$ of the upper camera case 3A at its front end portion are fitted with the lower surfaces of the right and left step portions $3B_2$ of the lower camera case 3B at its front end portion, and the metallic screws 44 inserted through the lower wall portions $3A_3$ and the step portions $3B_2$ are secured to the right and left mounting portions 77 of the metallic front panel chassis 2A. FIGS. 20A and 20B are enlarged views of one of such mounting portions using the screws 44. As shown in FIG. 20A, a peripheral portion 91a around a screw hole 91 formed through each of the lower wall portions $3A_3$ of the upper camera case 3A is raised by drawing to the coating layer 43 side opposite to the paint layer 42, i.e., inward of the upper camera case 3A, up to the height $T_2$ set to a value twice or more of the thickness $T_1$ of the painted rigid sheet 40. Furthermore, each of the step portions $3B_2$ of the lower camera case 3B is formed with a screw hole 92 having a diameter $D_2$ set greater than the outer diameter $D_1$ of the cylindrical peripheral portion 91a around the screw hole 91.

As shown in FIG. 20B, the cylindrical peripheral portion 91a around the screw hole 91 of each lower wall portion $3A_3$ of the upper camera case 3A is inserted into the screw hole 92 of each step portion $3B_2$ of the lower camera case 3B. Then, the screw 44 is inserted into the screw hole 92 and threadedly engaged with a tapped hole 93 formed through each mounting portion 77 of the front panel chassis 2A. Thus, the right and left lower wall portions $3A_3$ and the right and left step portions $3B_2$ are fastened to the right and left mounting portions 77 by the screws 44. Although the nonconductive paint layer 42 is present between the upper camera case 3A and the lower camera case 3B, an upper end 91b of the cylindrical peripheral portion 91a around the screw hole 91 of the upper camera case 3A comes into direct contact with the front panel chassis 2A, that is, the sheet metal 41 of the upper camera case 3A comes into direct contact with the front panel chassis 2A. Accordingly, conduction between the upper camera case 3A and the front panel chassis 2A can be ensured. Further, conduction between the lower camera case 3B and the front panel chassis 2A can also be ensured through the coating layer 43 of the lower camera case 3B.

Figure 21:
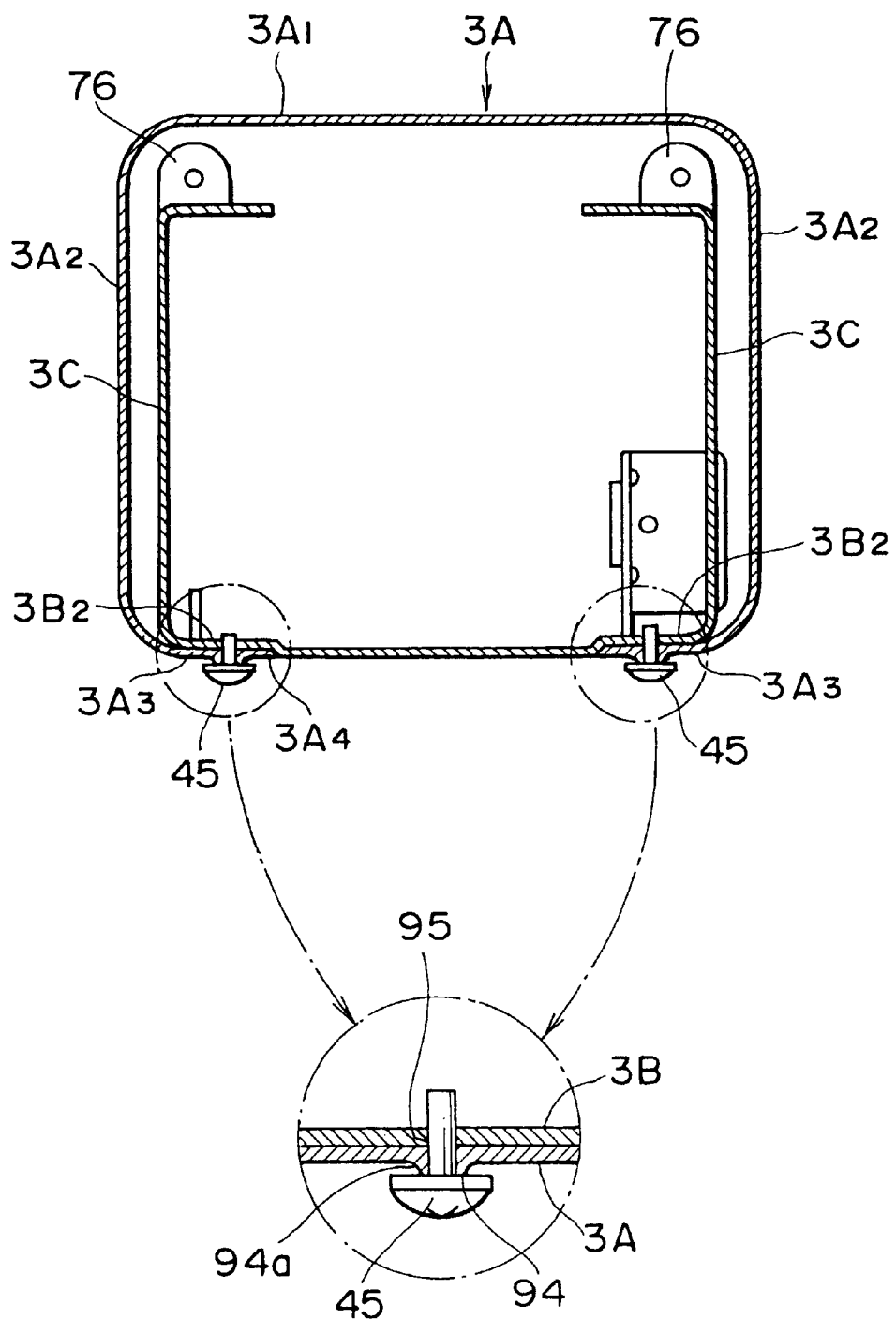
FIG. 21 is a cross sectional view of the CCD camera taken along the line G—G in FIG. 5.
Figure 22A:
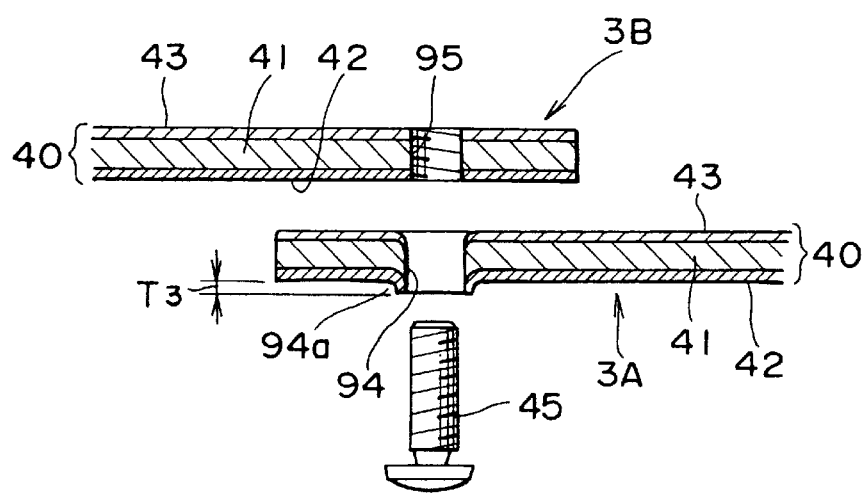
FIGS. 22A and 22B are enlarged sectional views for illustrating the details of other fastened portions of the upper camera case and the lower camera case of the CCD camera to each other.
Figure 22B:
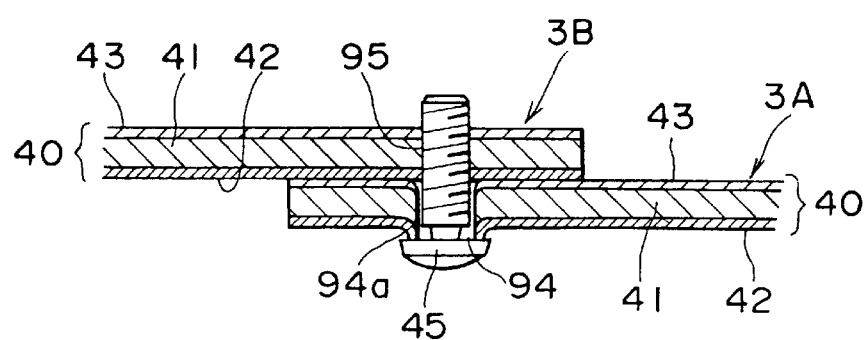

As shown in FIG. 21, the right and left lower wall portions $3A_3$ of the upper camera case 3A at its rear end portion are fitted with the lower surfaces of the right and left step portions $3B_2$ of the lower camera case 3B at its rear end portion, and the metallic screws 45 are used to secure the lower wall portions $3A_3$ and the step portions $3B_2$ to each other. FIGS. 22A and 22B are enlarged views of one of such mounting portions using the screws 45. As shown in FIG. 22A, each lower wall portion 3A₃ of the upper camera case 3A is formed with a screw hole 94, and each step portion 3B₂ of the lower camera case 3B is formed with a tapped hole 95. A peripheral edge 94a of the screw hole 94 is slightly projected by the height $T_3$ to the paint layer 42 side.

As shown in FIG. 22B, the screw 45 is inserted through the screw hole 94 of each lower wall portion 3A₃ of the upper camera case 3A, and is threadedly engaged with the tapped hole 95 of each step portion 3B₂ of the lower camera case 3B. Thus, the right and left lower wall portions 3A₃ and the right and left step portions 3B₂ are fastened to each other by the screws 45. At this time, the paint layer 42 of the upper camera case 3A is cut away by the screws 45 at the peripheral edges 94a of the screw hole 94. Accordingly, although the nonconductive paint layer 42 is present between the upper camera case 3A and the lower camera case 3B, the sheet metal 41 of the upper camera case 3A and the sheet metal 41 of the lower camera case 3B are made conductive by the metallic screws 45.

In this manner, although the painted rigid sheet 40 having the nonconductive paint layer 42 is used as each of the upper camera case 3A and the lower camera case 3B, conduction among the upper camera case 3A, the lower camera case 3B, and the metallic front panel chassis 2A can be ensured at their fastened portions by a simple fastening method using screws for fastening these members overlaid with the same side of surface on top. Since the metallic rigid sheet 40 is used as each of the upper camera case 3A and the lower camera case 3B, any special parts such as ground wires for making conduction between these members 3A and 3B are not required, thereby greatly reducing a cost. Further, although not shown, grounding means is connected to the grounding screw 38 secured to the camera chassis 3C, thereby grounding the front panel chassis 2A, the upper camera case 3A, and the lower camera case 3B.

(4) Description of Front Panel

As shown in FIGS. 12, and 25 to 27, the front panel 2 is composed of the front panel chassis 2A as a die cast part and the front panel cover 2B as a molded part. The front panel chassis 2A is integrally formed with a front wall 101 perpendicular to the optical axis P and a side wall 103 extending rearward from the outer periphery of the front wall 101. Similarly, the front panel cover 2B is integrally formed with a front wall 102 perpendicular to the optical axis P and a side wall 104 extending rearward from the outer periphery of the front wall 102. The front surface of the front wall 101 of the front panel chassis 2A is integrally formed with an annular lens mount 5 around the optical axis P. The front wall 102 of the front panel cover 2B is formed with a circular hole 105 around the optical axis P for engaging the lens mount 5. The rear surface of the front wall 101 of the front panel chassis 2A is integrally formed with a cylindrical portion 25 around the optical axis P. The side wall 103 of the front panel chassis 2A is integrally formed at its rear end with two upper mounting portions 78 and two lower mounting portions 77. A left side portion of the side wall 103 of the front panel chassis 2A is integrally formed with a screw mounting portion 106 for mounting a set screw 27, and a left side portion of the side wall 104 of the front panel cover 2B is formed with a screw insertion hole 107 aligned with the screw mounting portion 106.

The front panel chassis 2A is fitted within the front panel cover 2B, and they are joined together by four joining means 108 integrally formed between the front wall 101 of the front panel chassis 2A and the front wall 102 of the front panel cover 2B at the four corners outside of the cylindrical portion 25.

Figure 27A:
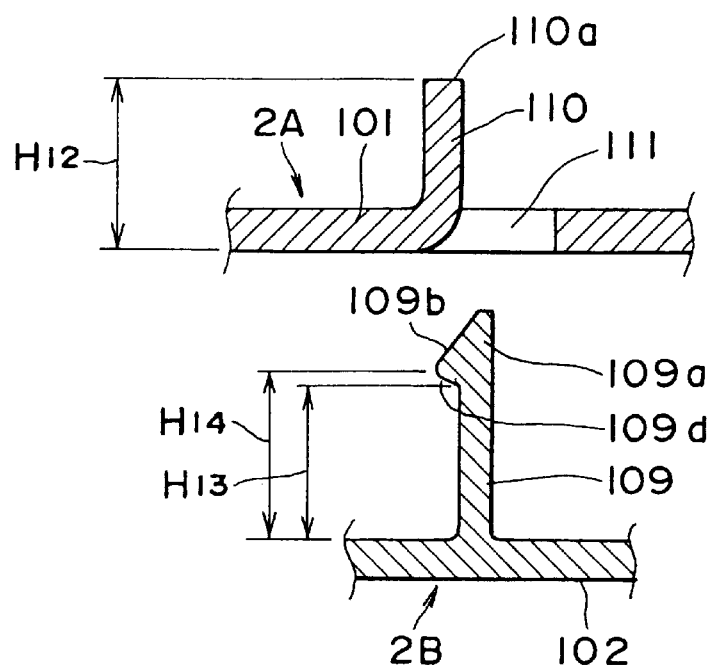
FIGS. 27A and 27B are enlarged sectional views of the connecting means shown in FIG. 25.
Figure 27B:
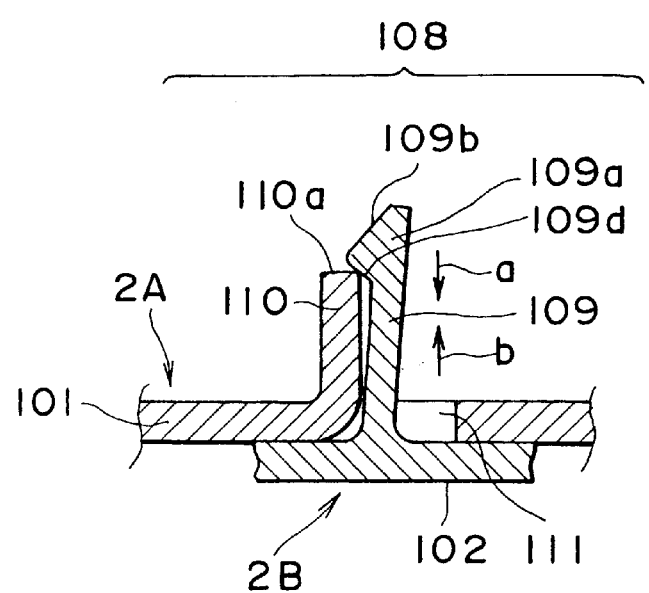

Each joining means 108 is composed of an elastic platelike lug 109 extending from the front wall 102 of the front panel cover 2B in parallel relationship to the optical axis P and an inelastic platelike stop 110 extending from the front wall 101 of the front panel chassis 2A. Further, the front wall 101 of the front panel chassis 2A is formed with four through holes 111 for insertion of the respective lugs 109 of the front panel cover 2B. As shown in FIGS. 27A and 27B, each lug 109 is relatively inserted into the corresponding through hole 111, and at this time the lug 109 is elastically deformed by the corresponding stop 110. That is, each lug 109 has an enlarged front end 109a, which is elastically urged by the corresponding stop 110 during insertion of the lug 109 and is finally engaged with an enlarged front end 110a of the corresponding stop 110, thereby joining the front panel chassis 2A and the front panel cover 2B. The enlarged front end 109a of each lug 109 is formed with a slant surface 109b for facilitating entry of the lug 109 into the corresponding through hole 111.

Figure 28A:
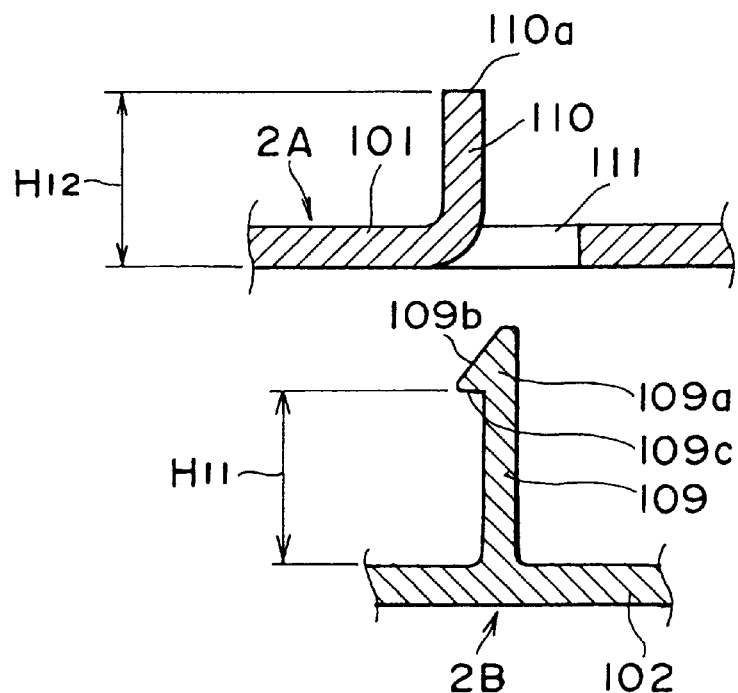
FIGS. 28A and 28B are enlarged sectional views similar to FIGS. 27A and 27B, showing the related art.
Figure 28B:
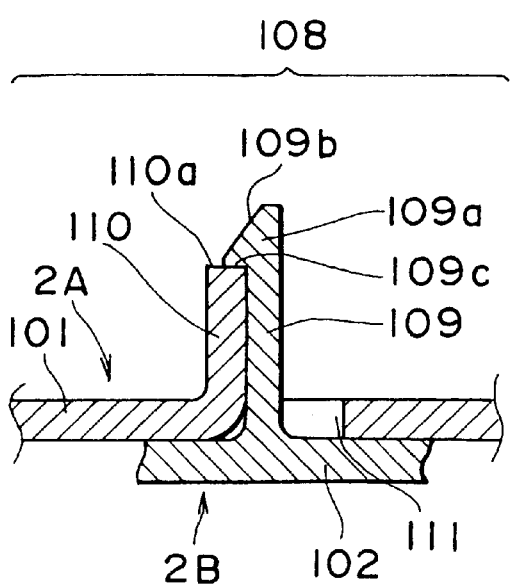
Figure 29B:
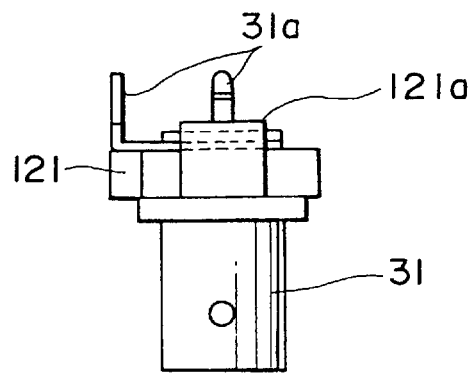
FIGS. 29A, 29B, and 29C are a front elevation, a top plan view, and a bottom plan view of an integrated BNC connector and terminal strips of the CCD camera, respectively.
Figure 29A:
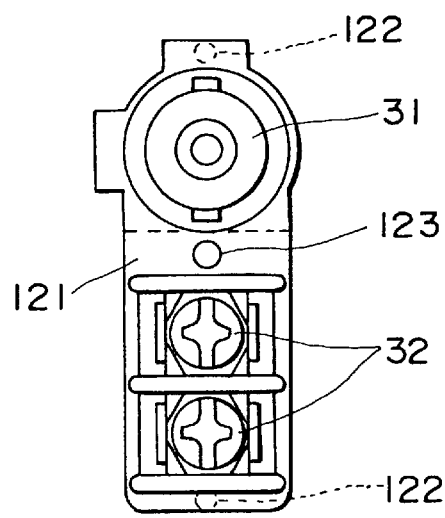
Figure 29C:
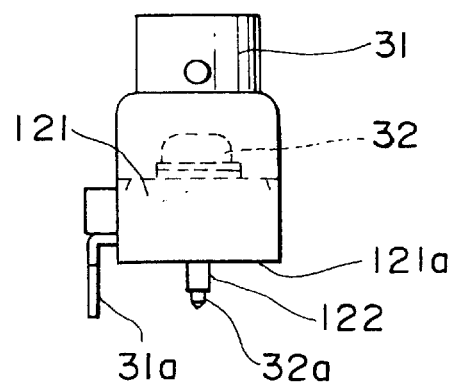

FIGS. 28A and 28B show a related art structure that the enlarged front end 109a of each lug 109 is formed with an engaging surface 109c perpendicular to the longitudinal direction of the lug 109, for engaging the enlarged front end 110a of the corresponding stop 110. In designing the height $H_{11}$ of the engaging surface 109c and the height $H_{12}$ of the enlarged front end 110a as shown in FIG. 28A, ideal engagement of the lug 109 with the corresponding stop 110 is obtained only when $H_{11}=H_{12}$. However, in forming the lugs 109 of the front panel cover 2B and the stops 110 of the front panel chassis 2A by using dies, it is very difficult to set the dimensions of the dies so as to satisfy the relation of $H_{11}=H_{12}$, causing a great cost increase. Accordingly, a dimensional error of $H_{11}<H_{12}$ or $H_{11}>H_{12}$ tends to occur in usual die forming. If $H_{11}>H_{12}$, there arises play in a direction parallel to the optical axis P between the lugs 109 and the stops 110, whereas if $H_{11}<H_{12}$, the lugs 109 cannot be engaged with the stops 110.

To cope with this problem, the enlarged front end 109a of each lug 109 in the present invention is formed with a slant surface 109d tilted with respect to the optical axis P parallel to the direction of engagement of the front panel chassis 2A and the front panel cover 2B, for engaging the enlarged front end 110a of the corresponding stop 110. Moreover, the minimum height $H_{13}$ and the maximum height $H_{14}$ of the slant surface 109d are set in relation with the height $H_{12}$ of the enlarged front end 110a of each stop 110 so as to satisfy $H_{13}<H_{12}$ and $H_{14}>H_{12}$ as shown in FIG. 27A.

Accordingly, when engaging the lugs 109 with the stops 110 of the CCD camera 1 as shown in FIG. 27B, the enlarged front end 110a of each stop 110 is always engaged with the slant surface 109d of the corresponding lug 109 in the range between the minimum height $H_{13}$ and the maximum height $H_{14}$. In this condition, mutual tensile forces having directions shown by arrows a and b are generated at the slant surface 109d as shown in FIG. 27B to mutually attract the front panel chassis 2A and the front panel cover 2B in the opposite directions of the arrows a and b, thereby highly accurately joining them together without play. Further, a relatively large dimensional tolerance in forming the lugs 109 and the stops 110 can be ensured. In modification, the lugs 109 may be formed on the front panel chassis 2A side, and the stop 110 may be formed on the front panel cover 2B side.

(5) Description of Connector and Terminal Strips

Figure 31C:
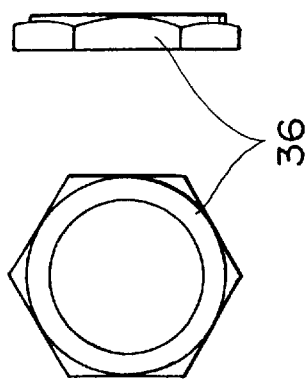
FIGS. 31A, 31B, and 31C are a partially sectional side view and a front elevation of the BNC connector and a combined elevation and side view of a nut for fastening the BNC connector, respectively.
Figure 31A:
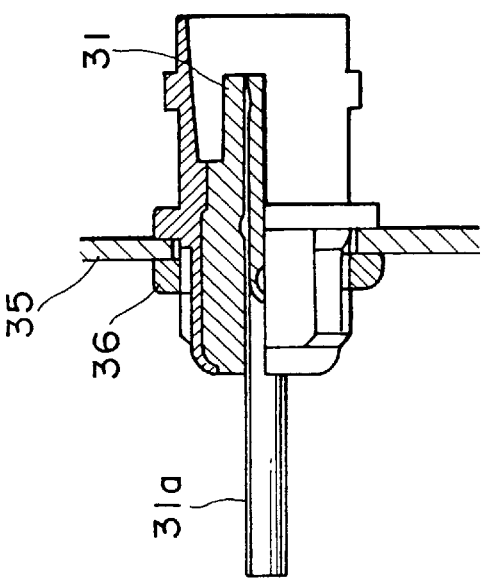
Figure 31B:
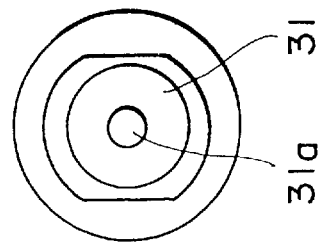
Figure 32A:
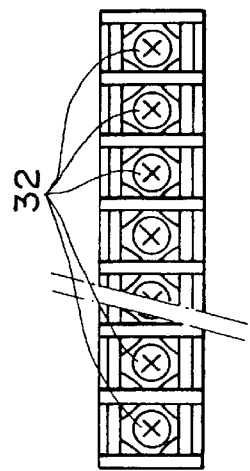
FIGS. 32A, 32B, and 32C are a front elevation, a side view, and an end view of a multi-strip terminal of the CCD camera in the related art, respectively.
Figure 32C:
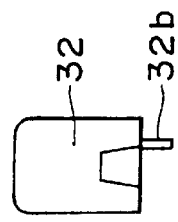
Figure 32B:
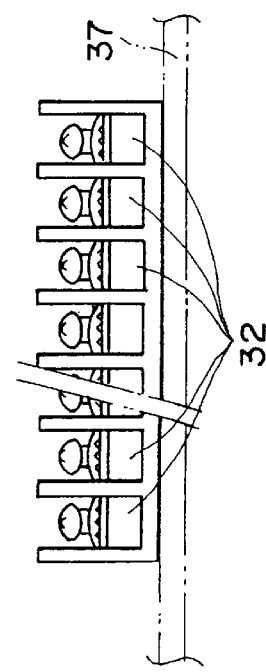

FIGS. 31A to 31C show a mounting structure of a BNC connector 31 and FIGS. 32A to 32C show terminal strips 32 in the related art. As shown in FIGS. 31A to 31C, the BNC connector 31 is fastened to a rear panel chassis 35 as a rear panel frame by means of a metallic nut 36, and a harness (not shown) for transmitting a signal is connected to a leg 31a of the BNC connector 31 by soldering or connector-coupling. As shown in FIGS. 32A to 32C, the terminal strips 32 are formed by cutting a multi-terminal stock into a part having a given number of terminals to be joined, so that this part cannot be formed with positioning pins. Accordingly, in soldering the terminal strips 32 having the given number of terminals to a printed circuit board 37 by dipping, the terminal strips 32 are positioned by utilizing legs 32a of the terminal strips 32 as the positioning pins to engage the legs 32a into holes of the printed circuit board 37. Thereafter, the printed circuit board 37 to which the terminal strips 32 have been soldered by dipping is fastened to the rear panel chassis 35 by screws.

Thus in manufacturing the CCD camera 1 in the related art, the metallic nut 36 for mounting the BNC connector 31 to the rear panel chassis 35 must be tightened with a given torque by using a special tool, and the work for soldering the harness to the BNC connector 31 is troublesome. Further, the solder dipping of the terminal strips 32 to the printed circuit board 37 is carried out completely separately from the mounting step for the BNC connector 31, and the positioning of the terminal strips 32 by the engagement of the legs 32a into the holes of the printed circuit board 37 is low in accuracy to cause easy occurrence of positioning error such as tilt of the terminal strips 32. Accordingly, the positioning accuracy must be ensured by using a special jig, and this work is also troublesome.

Consequently, the manufacturing method for the CCD camera 1 in the related art has disadvantages that the BNC connector 31 and the terminal strips 32 cannot be mounted to the printed circuit board 37 in one step and that the printed circuit board 37 on which the BNC connector 31 and the terminal strips 32 have been mounted cannot be simply connected through a flexible printed circuit board or the like to a given circuit, resulting in a requirement of much time for assembly and a cost increase.

Referring to FIGS. 29A to 29C and FIGS. 30A and 30B, there is shown an assembly of the BNC connector 31 and the terminal strips 32 according to the present invention. A connector base 121 formed of a synthetic resin or the like is used to integrally mount the BNC connector 31 at an upper portion and to integrally mount the two terminal strips 32 at a lower portion. The connector base 121 has a mount surface 121a to be mounted on the CT board 63, and the mount surface 121a is integrally formed at its upper and lower ends with a pair of positioning pins 122. A tapped hole 123 is formed at an intermediate portion of the connector base 121 between the BNC connector 31 and the terminal strips 32.

Figure 30A:
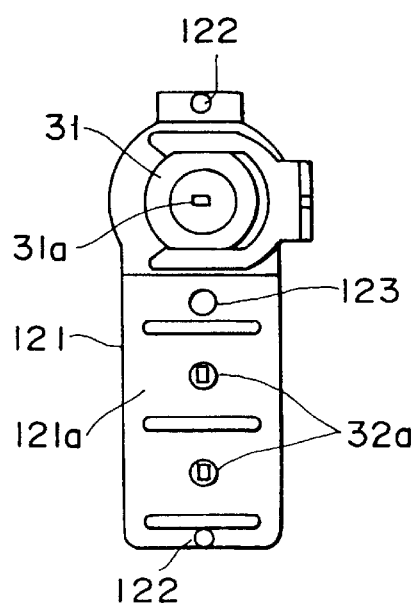
FIGS. 30A and 30B are a rear elevation and a sectional view of the integrated BNC connector and terminal strips, respectively.
Figure 30B:
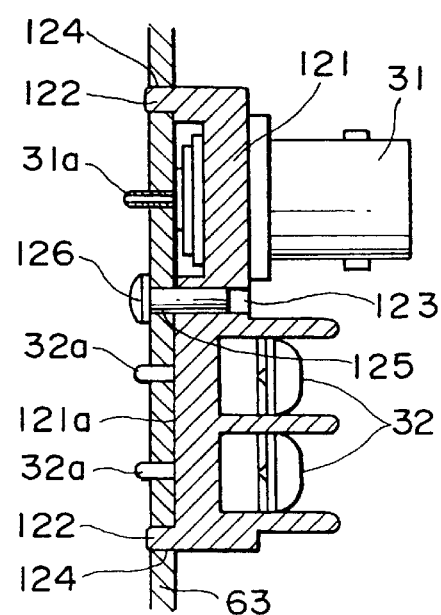

As shown in FIG. 30B, the positioning pins 122 of the connector base 121 are engaged into a pair of pin holes 124 formed through the CT board 63 of a printed circuit board, thereby enabling simple but highly accurate positioning of the BNC connector 31 and the terminal strips 32 to the CT board 63. Then, the legs 31a and 32a of the BNC connector 31 and the terminal strips 32 can be soldered to the CT board 63 in one step by solder dipping. The CT board 63 is formed with a through hole 125 for insertion of a screw 126. The screw 126 is inserted through the through hole 125 of the CT board 63 and threadedly engaged with the tapped hole 123 of the connector base 121, thereby fastening the connector base 121 to the CT board 63. Accordingly, an excess stress due to connection or disconnection of a cable to or from the BNC connector 31 is prevented from being directly applied to soldered portions of the legs 31a and 32a to the CT board 63. That is, the excess stress can be received by the entire CT board 63 to thereby prevent separation of the soldered portions of the legs 31a and 32a. Since the BNC connector 31 and the terminal strips 32 are integrated with the connector base 121, and the legs 31a and 32a are directly soldered to the CT board 63, the rear panel 4 can be made chassisless. As mentioned above, the CT board 63 can be simply fastened to the rear ends of the right and left camera chassis 3C by the two screws 75 after positioned by the slits 74. Then, the CT board 63 can be simply connected to the PS board 61 and the PR board 62 by connector coupling using flexible printed circuit boards, thereby simply connecting the BNC connector 31 and the terminal strips 32 to given circuits including the PS board 61 and the PR board 62.

(6) Description of Flange Back Focus Adjusting Mechanism

As shown in FIGS. 49A and 49B and FIGS. 50A and 50B showing the cam mechanism of the CCD camera 1 in the related art, each of the pair of cam followers 15 of the CCD holder 13 is integrally formed with two radially extending ribs 15c having different height $H_1$ and $H_2$ in the direction of the optical axis P. The two ribs 15c of each cam follower 15 are kept in pressure contact with three tilted cam surfaces 16a, 16b, and 16c of the corresponding cam 16 by the corresponding spring 17 in the direction of the optical axis P. The three tilted cam surfaces 16a, 16b, and 16c are different in angle of tilt and height in the direction of the optical axis P.

Accordingly, the flange back focus adjusting mechanism 11 in the related art CCD camera 1 is designed so as to maintain the balance of the CCD holder 13 in a four-point contact fashion such that the total four ribs 15c of the pair of cam followers 15 equally spaced at 180° from each other in the circumferential direction of the CCD holder 13 are in contact with the cam surfaces 16a, 16b, and 16c of the pair of cams 16 equally spaced at 180° from each other in the circumferential direction of the adjuster ring 14. However, in actual, the four ribs 15c are not always in contact with the cam surfaces 16a to 16c, but three of the four ribs 15c variably come into contact with the cam surfaces 16a to 16c. In other words, any one of the four ribs 15c is always separate from the cam surfaces 16a to 16c. Accordingly, the CCD holder 13 is minutely vibrated depending on what three of the four ribs 15c are used to keep the balance of the CCD holder 13.

Figure 50A:
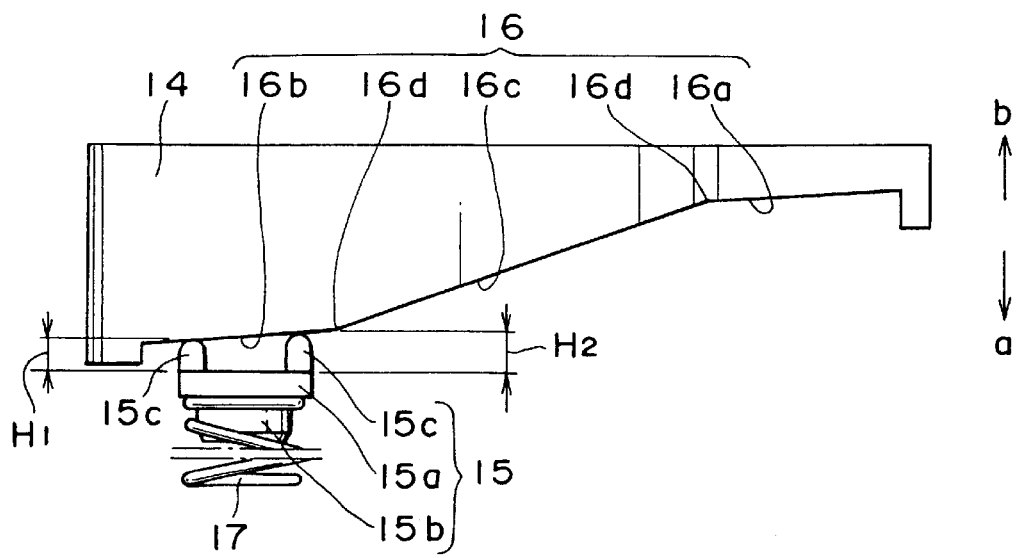
FIGS. 50A and 50B are enlarged side views of a cam and a cam follower in the related art.
Figure 50B:
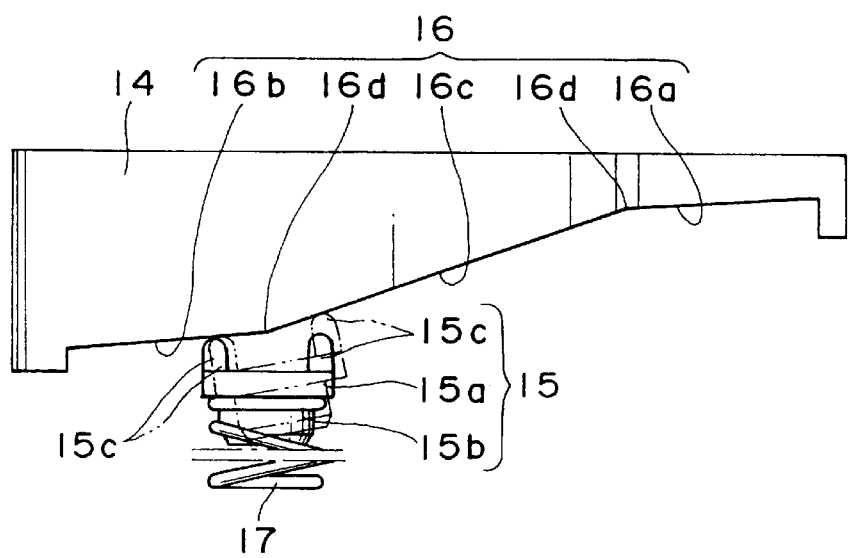

The cam surfaces 16a and 16b are gentler slopes for fine adjustment, and the cam surface 16c is a steep slope for coarse adjustment. Further, the heights $H_1$ and $H_2$ of the two ribs 15c of each cam follower 15 are set so as to correspond to the angle of tilt of the gentle cam surfaces 16a and 16b. Accordingly, these two ribs 15c are stable on the gentler cam surfaces 16a and 16b, but are not stable on the steep cam surface 16c. Furthermore, when a point 16d between the cam surfaces 16a and 16c or another point 16d between the cam surfaces 16c and 16b comes between the two ribs 15c as shown in FIG. 50B, undue tilt forces are applied to the two cam followers 15, causing an unstable holding condition of the CCD holder 13. The instability of the CCD holder 13 causing vibrations is a serious problem because it immediately causes face vibrations of the CCD 12, which lead to a deterioration in image quality.

Referring to FIGS. 33 to 47B, there is shown a flange back focus adjusting mechanism 11 in the CCD camera 1 according to the present invention. The adjuster ring 14 as a molded part has a front surface 14a integrally formed with three arcuate cams 16 equally spaced at 120° from each other in the inner circumferential direction of the adjuster ring 14.

The CCD holder 13 as a molded part has an outer circumferential surface integrally formed with three cam followers 15 radially extending and equally spaced at 120° from each other in the outer circumferential direction of the CCD holder 13. The three cam followers 15 of the CCD holder 13 are respectively pressed on the three cams 16 by three compression coil springs 17 in the direction of the arrow b in FIG. 33. Each cam follower 15 of the CCD holder 13 includes a platelike spring seat 15a extending radially from the outer circumference of the CCD holder 13 in perpendicular relationship to the optical axis P, a cylindrical spring retainer 15b formed on the front surface of the spring seat 15a at a substantially central portion thereof, and a single cam following rib 15c formed on the rear surface of the spring seat 15a at a substantially central portion thereof so as to extend radially from the outer circumference of the CCD holder 13.

The rear ends of the three springs 17 are engaged with the spring retainers 15b of the three cam followers 15 so as to abut against the spring seats 15a, therefore, the CCD holder 13 is urged against the adjuster ring 14 in the direction of the arrow b by the biasing forces of the three springs 17. Accordingly, the total three ribs 15c of the three cam followers 15 are pressed on the three cams 16 of the adjuster ring 14 in the direction of the arrow b. Thus, the three ribs 15c of the CCD holder 13 respectively correspond to the three cams 16, and can be always stably kept in pressure contact with the three cams 16 at three points, thereby always stably maintaining the balance of the CCD holder 13.

Figure 47A:
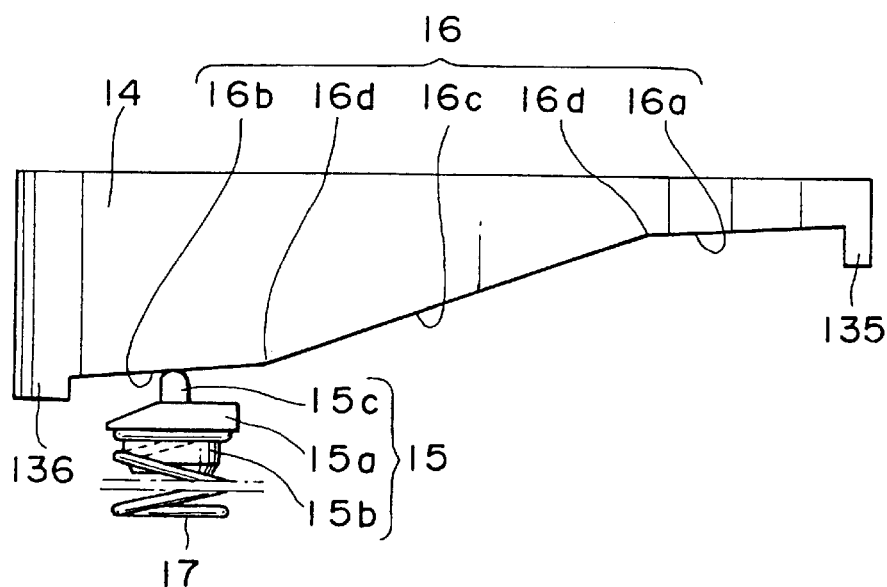
FIGS. 47A and 47B are enlarged side views of the cam and the cam follower shown in FIGS. 46A to 46F.
Figure 47B:
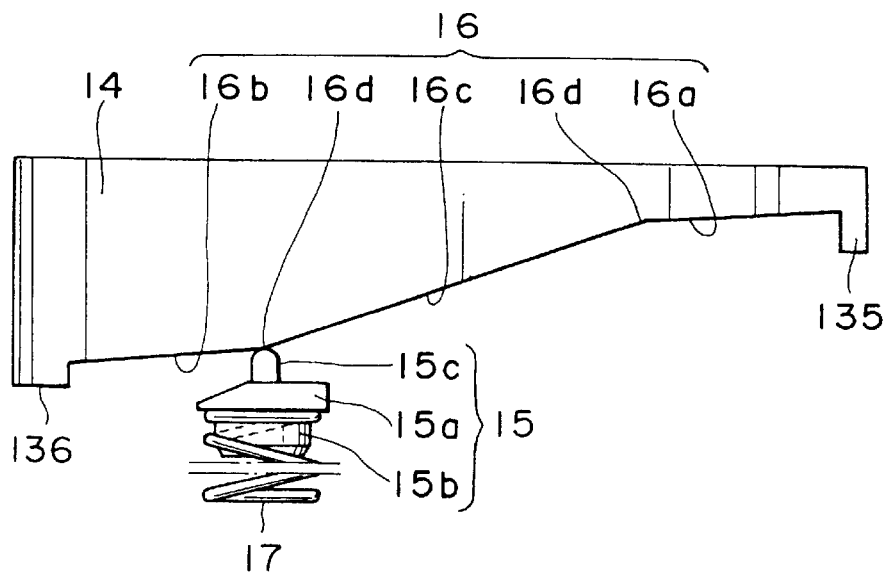

As shown in FIGS. 47A and 47B, the single rib 15c is in contact with the corresponding cam 16. Accordingly, in adjusting the flange back focus L of the CCD 12 by rotating the adjuster ring 14, each rib 15c can be moved relatively stably and smoothly both on the cam surfaces 16a and 16b formed as gentle slopes for fine adjustment and on the cam surface 16c formed as a steep slope for coarse adjustment. Furthermore, no undue tilt force is generated on each rib 15c at a point 16d between the cam surfaces 16a and 16c or at another point 16d between the cam surfaces 16c and 16b, those where the degree of tilt is changed. As a result, the instability of the CCD holder 13 such as vibrations can be eliminated to thereby prevent a deterioration in image quality due to face vibrations of the CCD 12 and provide always stable images, thus greatly improving the reliability of the CCD camera 1 as a video camera.

Figure 53:
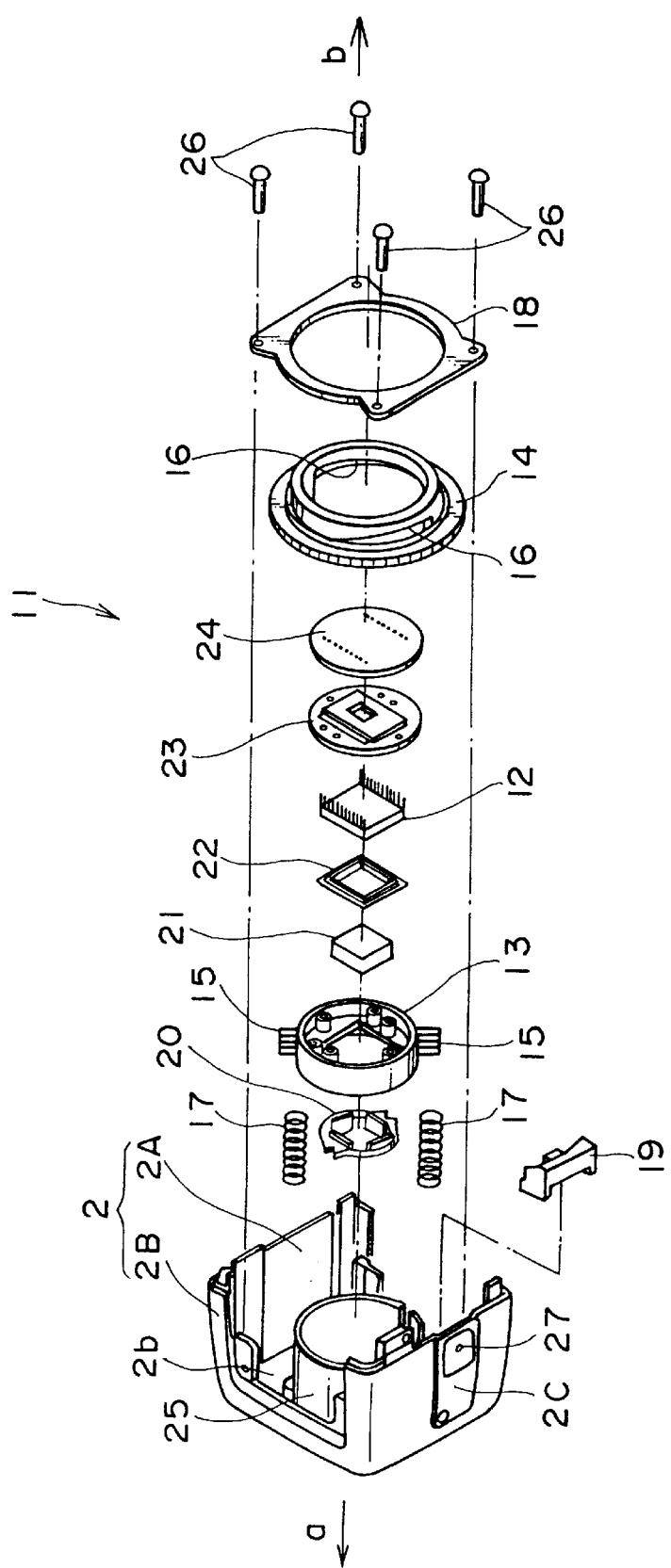
FIG. 53 is an exploded perspective view of a flange back focus adjusting mechanism of the CCD camera in the related art.

Further, the flange back focus adjusting mechanism 11 in the related art CCD camera 1 shown in FIG. 53 includes the ring holder plate 18 as a dedicated part for holding the adjuster ring 14 on which the CCD holder 13 is pressed by the biasing forces of the two springs 17 in the direction of the arrow b. The ring holder plate 18 is fastened to the rear wall 2b of the front panel 2 against the biasing forces of the two springs 17 by the four screws 26. Accordingly, in assembling the mechanism 11, the adjuster ring 14 must be urged by the ring holder plate 18 in the direction of the arrow a against the biasing forces of the springs 17, and the ring holder plate 18 in such an unstable condition is fastened to the rear wall 2b of the front panel 2 by the four screws 26. Alternatively, a special jig for stabilizing the ring holder plate 18 must be prepared and the ring holder plate 18 stabilized by the jig is fastened to the rear wall 2b of the front panel 2 by the screws 26. Accordingly, the work for fastening the ring holder plate 18 by using the screws 26 is inefficient to cause a reduction in productivity. Similarly, the work for disassembling the mechanism 11 for the purpose of repair or the like is troublesome. In addition, because the ring holder plate 18 and the four screws 26 are used, the increased number of parts and assembly steps leads to result in causing a cost increase.

To cope with this problem, the flange back focus adjusting mechanism 11 in the CCD camera 1 of the present invention adopts a structure such that the adjuster ring 14 can be mounted inside the front panel 2 with a single motion.

As shown in FIGS. 33 to 46F, the cylindrical portion 25 integrally formed with the front panel chassis 2A as a die cast part is formed with three guide slots 131 circumferentially equally spaced from each other and extending parallel to the optical axis P. Each guide slot 131 is open to the rear end of the cylindrical portion 25 (on the rear panel 4 side). The rear surface of the front wall 101 of the front panel chassis 2A is integrally formed with three spring retainers 132 for engaging the front ends of the three springs 17. Further, the rear end of the cylindrical portion 25 is integrally formed with three radially projecting lugs 133 adjacent to the open ends of the three slots 131, for engaging the adjuster ring 14. The inner circumferential surface of the adjuster ring 14 is formed with three grooves 134 equally spaced at 120° from each other in the circumferential direction of the adjuster ring 14 and located adjacent to the cam surfaces 16a of the three cams 16, for receiving the three lugs 133 of the cylindrical portion 25. These grooves 134 extend between the front surface 14a and the rear surface 14b of the adjuster ring 14. Further, the circumferential opposite ends of each cam 16 of the adjuster ring 14 is integrally formed with a pair of stoppers 135 and 136 for preventing escape of the rib 15c of the corresponding cam follower 15.

The flange back focus adjusting mechanism 11 can be simply assembled in such a manner as shown in FIGS. 45A and 45B and FIGS. 46A to 46F. FIGS. 46A to 46F are linearly developed views of the mechanism 11 for illustrating the principle of flange back focus adjustment.

Figure 42:
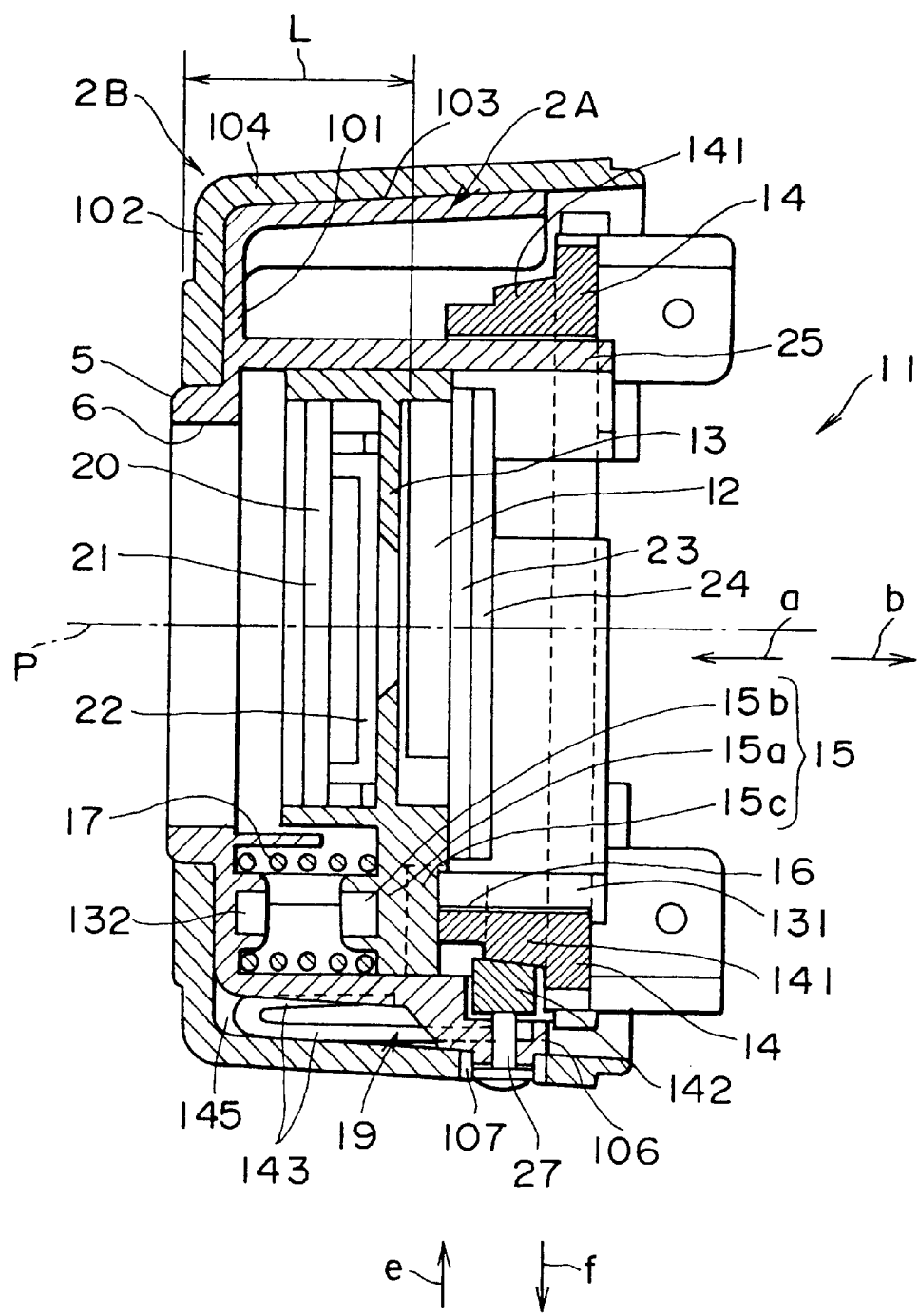
FIG. 42 is a cross sectional view taken along the line M—M in FIG. 41.
Figure 43:
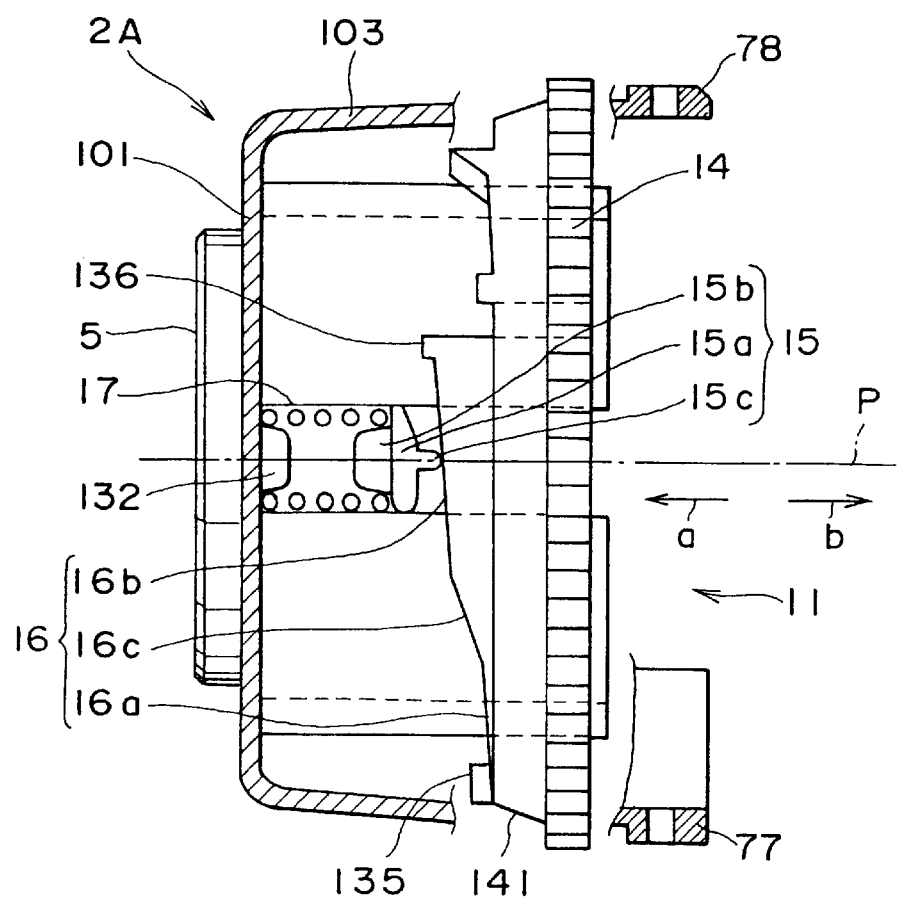
FIG. 43 is a cross sectional view taken along the line N—N in FIG. 41.
Figure 44:
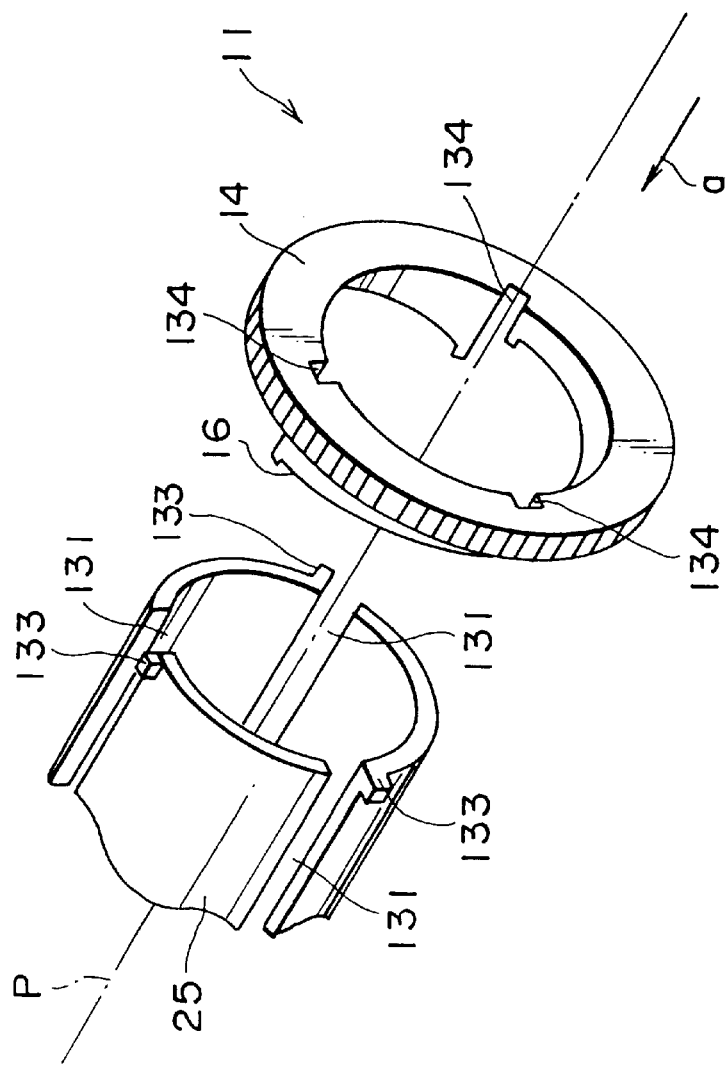
FIG. 44 is an exploded perspective view of the cylindrical portion and the adjuster ring.

First, the three springs 17 are inserted into the three guide slots 131 of the cylindrical portion 25 of the front panel chassis 2A in the direction of the arrow a parallel to the optical axis P, and the front ends of the three springs 17 are engaged with the three spring retainers 132 of the front panel chassis 2A as shown in FIG. 42. Secondly, the three cam followers 15 of the CCD holder 13 are inserted into the three guide slots 131 in the direction of the arrow a, and the three spring retainers 15b of the three cam followers 15 are engaged with the rear ends of the three springs 17 as shown in FIG. 42. The CCD 12 together with a filter bracket 20, filter 21, rubber seal 22, CCD bracket 23, and CCD board 24 are preliminarily mounted to the CCD holder 13 by means of two screws 137.

Figure 45A:
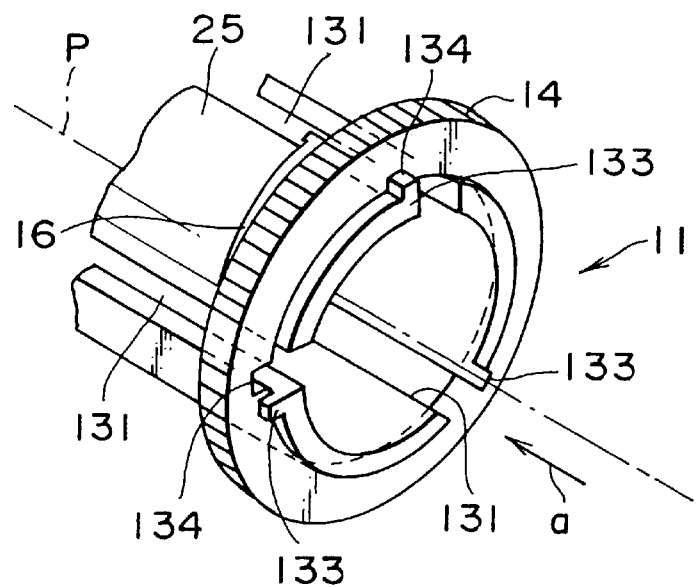
FIGS. 45A and 45B are perspective views for illustrating a method of mounting the adjuster ring to the cylindrical portion.

Finally, the inner circumference of the adjuster ring 14 is fitted with the outer circumference of the cylindrical portion 25 in the direction of the arrow a in such a manner that the three grooves 134 of the adjuster ring 14 receive the three lugs 133 of the cylindrical portion 25 as shown in FIG. 45A. At this time, the three stoppers 135 of the adjuster ring 14 abut against the three ribs 15c of the three cam followers 15 in the direction of the arrow a as shown in FIG. 46A to compress the three springs 17.

Figure 45B:
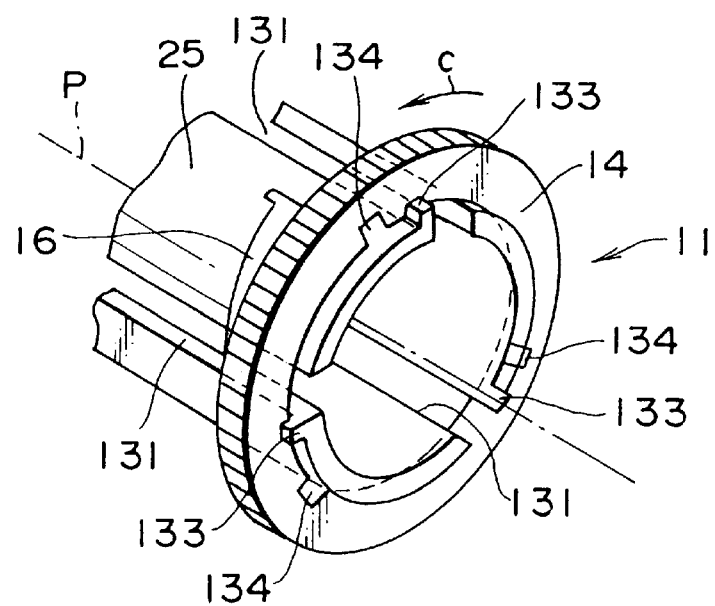
Figure 46A:
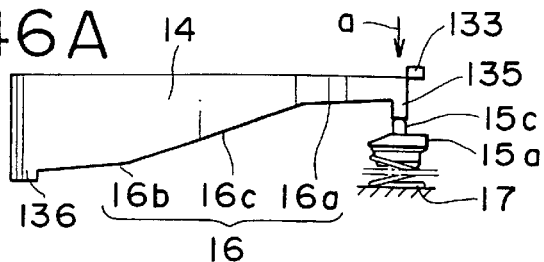
FIGS. 46A to 46F are linearly developed side views of a cam of the adjuster ring in relation to a cam follower, for illustrating mounting of the adjuster ring and flange back focus adjustment.
Figure 46B:
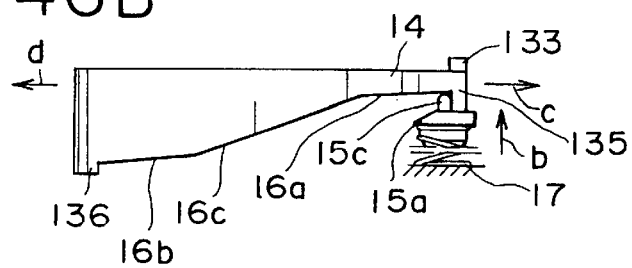

When the rear surface 14b of the adjuster ring 14 comes to a position before the three lugs 133 as shown in FIG. 46A, the adjuster ring 14 is slightly rotated in the specified circumferential direction shown by an arrow c as shown in FIGS. 45B and 46B. Accordingly, the three ribs 15c of the three cam followers 15 are disengaged from the three stoppers 135 and pressed onto the cam surfaces 16a of the three cams 16 by the biasing forces of the three springs 17 in the direction of the arrow b. At the same time, the entire adjuster ring 14 is urged in the direction of the arrow b by the biasing forces of the three springs 17, and the rear surface 14b of the adjuster ring 14 is pressed on the front surfaces of the three lugs 133. Thus, the adjuster ring 14 is stabilized and the assembly is completed.

In short, the adjuster ring 14 can be very easily mounted on the outer circumference of the cylindrical portion 25 by a simple operation as follows; first relatively inserting the three lugs 133 of the cylindrical portion 25 through the three grooves 134 of the adjuster ring 14 in the direction of arrow a as shown in FIG. 45A and next rotating the adjuster ring 14 on the outer circumference of the cylindrical portion 25 in the direction of the arrow c as shown in FIG. 45B. Furthermore, the flange back focus adjusting mechanism 11 in the present invention does not require the ring holder plate 18 as a dedicated part used in the related art and accordingly does not require the troublesome work for fastening the ring holder plate 18 by use of screws, but allows the single-motion attachment of the adjuster ring 14 to the cylindrical portion 25. As a result, a great cost reduction by a decrease in number of parts and assembly steps can be attained, and the assemblability and disassemblability of the flange back focus adjusting mechanism can be remarkably improved.

In the assembled condition shown in FIG. 46B, the three stoppers 135 of the adjuster ring 14 abut against the side surfaces of the three ribs 15c of the cam followers 15, so that the rotation of the adjuster ring 14 in the direction shown by an arrow d opposite to the arrow a is prohibited, thereby preventing undue removal of the adjuster ring 14 from the cylindrical portion 25 by the biasing forces of the springs 17. That is, if the stoppers 135 are not formed, the adjuster ring 14 would be rotated in the direction of the arrow d because of vibrations up to a position where the three grooves 134 and the three lugs 133 coincide in phase, resulting in undue removal of the adjuster ring 14 from the cylindrical portion 25 by the biasing forces of the springs 17.

Figure 46C:
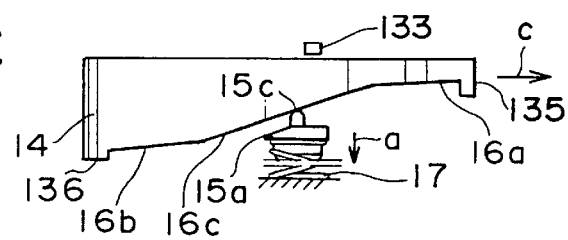
Figure 46D:
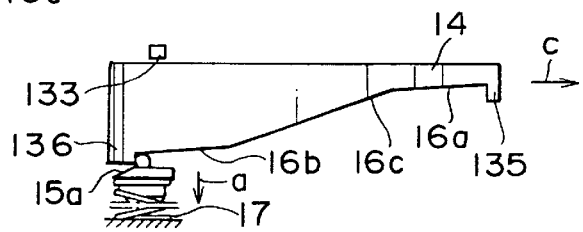

When the adjuster ring 14 in the condition of FIG. 46B is rotated in the direction of the arrow c, the CCD holder 13 is moved forward in the direction of the arrow a against the biasing forces of the three springs 17 according to the cam profile of the three cams 16 as shown in FIG. 46C. Finally, the three stoppers 136 of the adjuster ring 14 come into abutment against the side surfaces of the three ribs 15c as shown in FIG. 46D, thereby stopping further rotation of the adjuster ring 14 in the direction of the arrow c. In this manner, the flange back focus L of the CCD 12 is adjusted to be decreased by the rotation of the adjuster ring 14 in the direction of the arrow c.

Figure 46E:
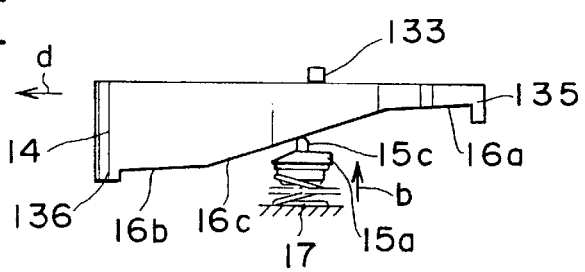
Figure 46F:
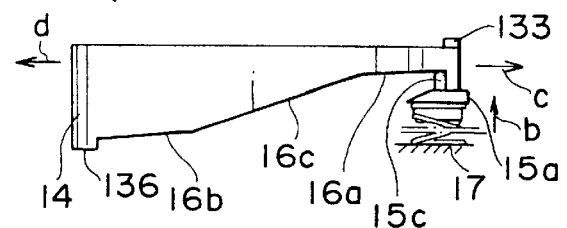

When the adjuster ring 14 in the condition of FIG. 46D is rotated in the direction of the arrow d, the CCD holder 13 is moved parallel backward in the direction of the arrow b by the biasing forces of the three springs 17 according to the cam profile of the three cams 16 as shown in FIG. 46E. Finally, the three stoppers 135 of the adjuster ring 14 come into abutment against the side surfaces of the three ribs 15c as shown in FIG. 46F, thereby stopping further rotation of the three cams 16 in the direction of the arrow d. In this manner, the flange back focus L of the CCD 12 is adjusted to be increased by the rotation of the adjuster ring 14 in the direction of the arrow d.

(7) Description of Lock Member

Figure 33:
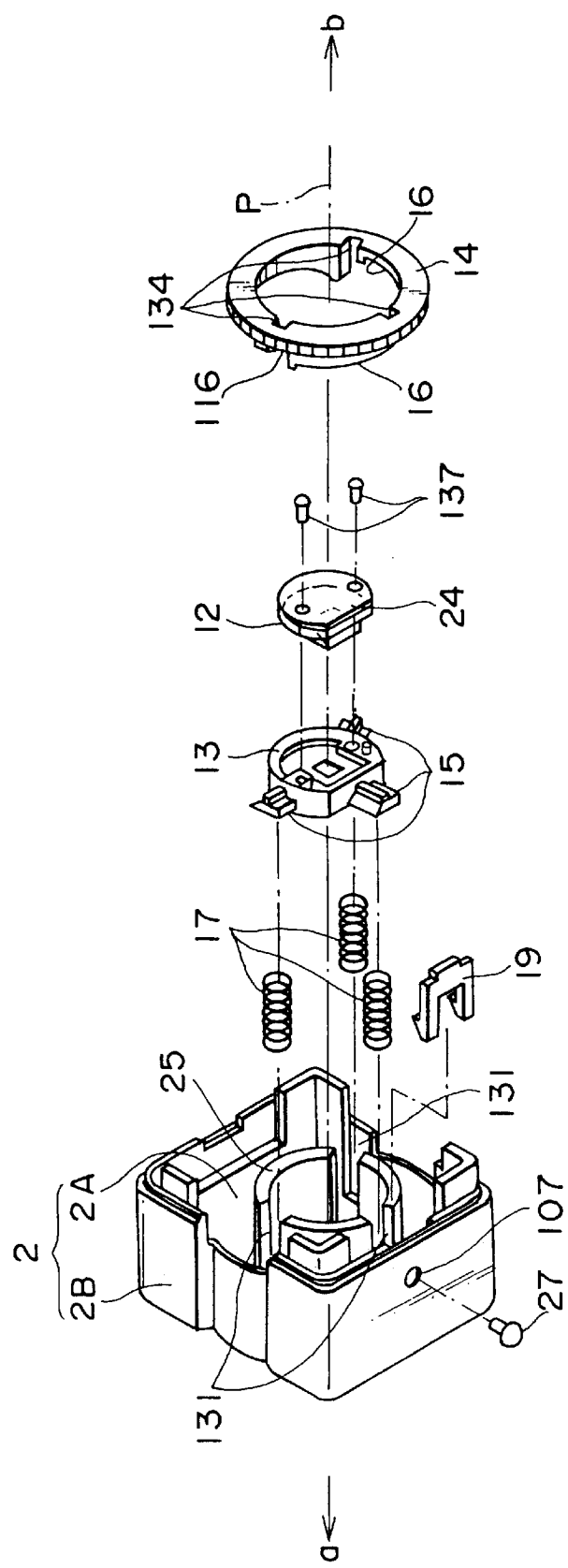
FIG. 33 is an exploded perspective view of a flange back focus adjusting mechanism of the CCD camera according to the present invention.
Figure 34:
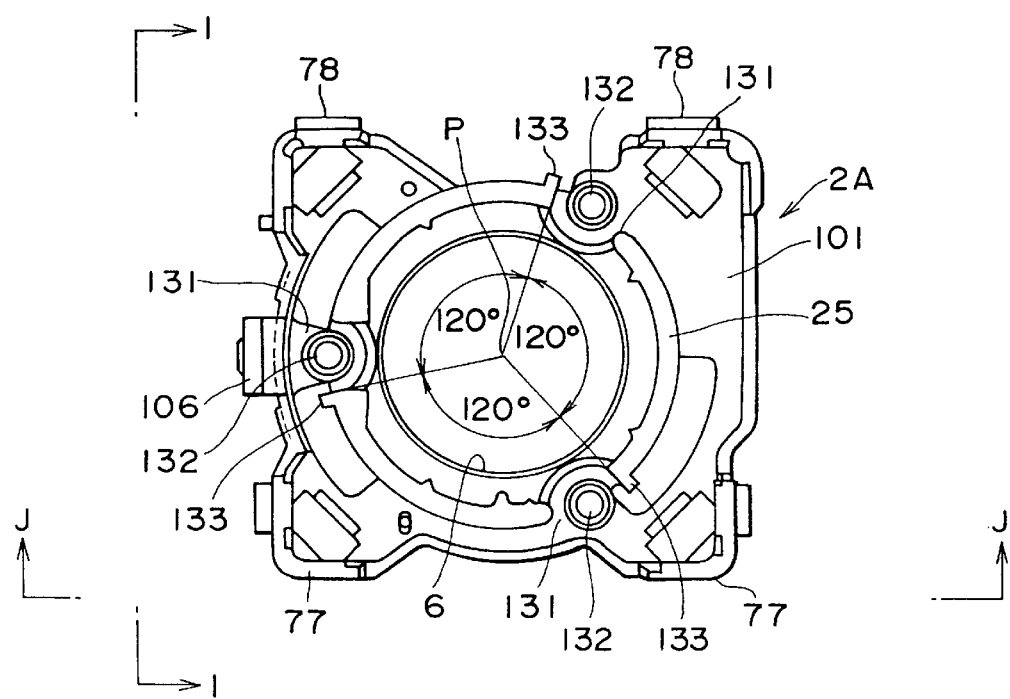
FIG. 34 is a rear view showing the front panel chassis in the flange back focus adjusting mechanism.
Figure 35:
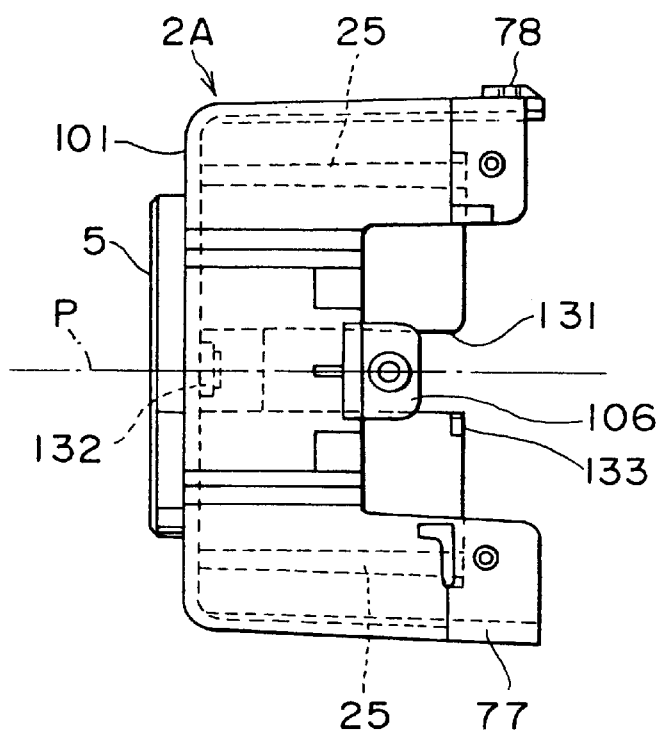
FIG. 35 is a side view taken in the direction shown by arrows I—I in FIG. 34.
Figure 36:
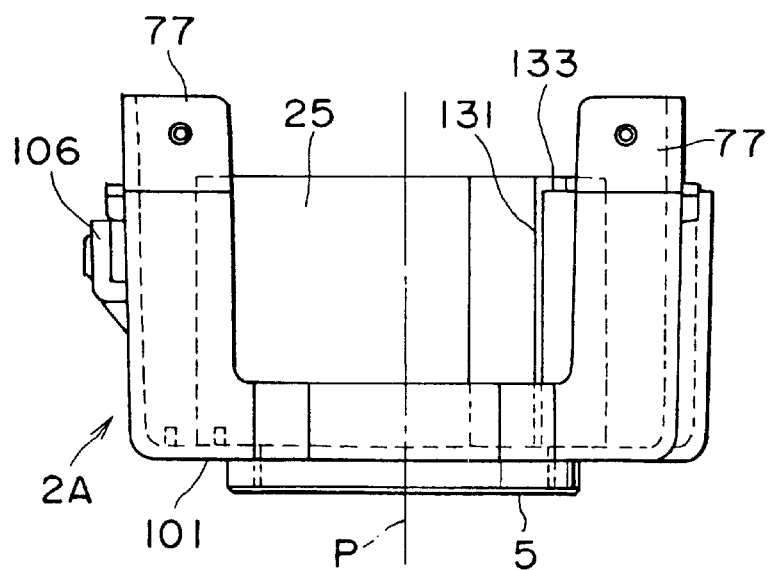
FIG. 36 is a bottom plan view taken in the direction shown by arrows J—J in FIG. 34.
Figure 37C:
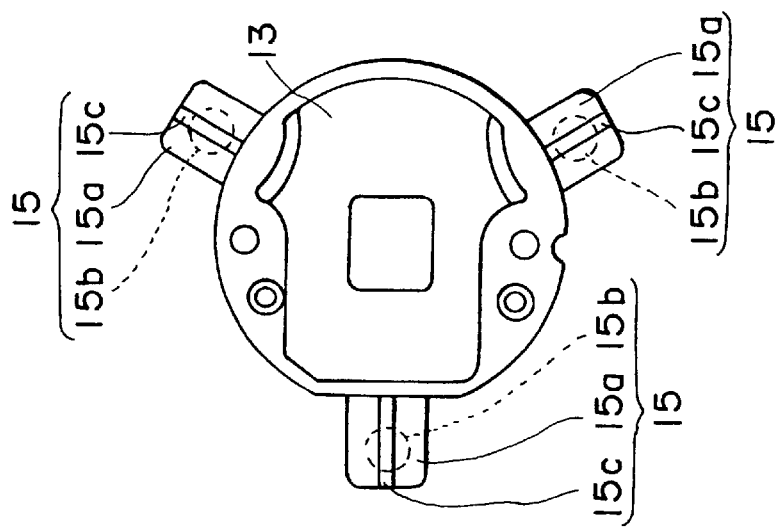
FIGS. 37A, 37B, and 37C are a front view, a side view, and a rear view of a CCD holder of the flange back focus adjusting mechanism, respectively.
Figure 37B:
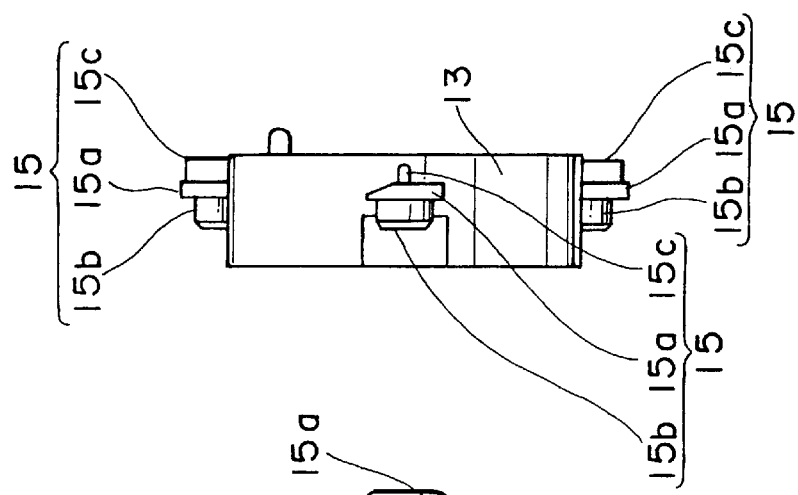
Figure 37A:
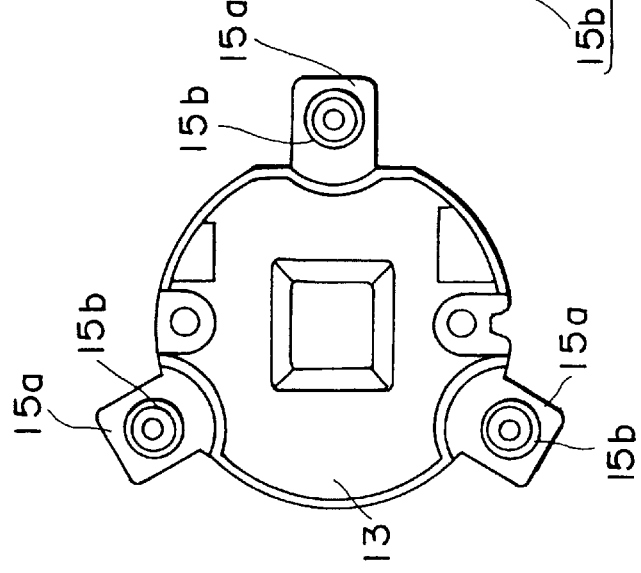
Figure 38:
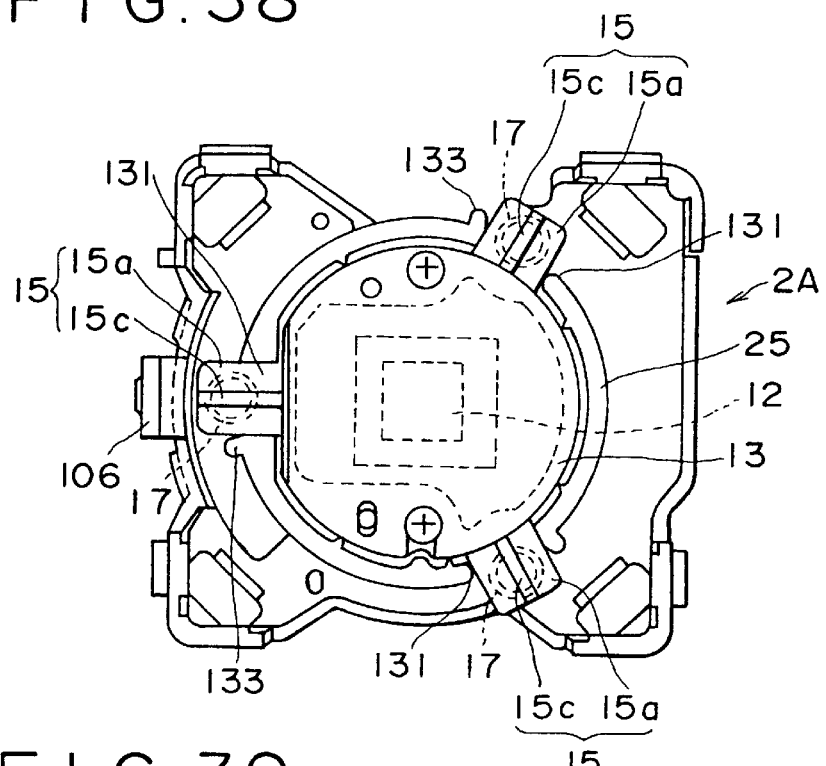
FIG. 38 is a rear view of the CCD holder inserted in a cylindrical portion of the front panel chassis.
Figure 39:
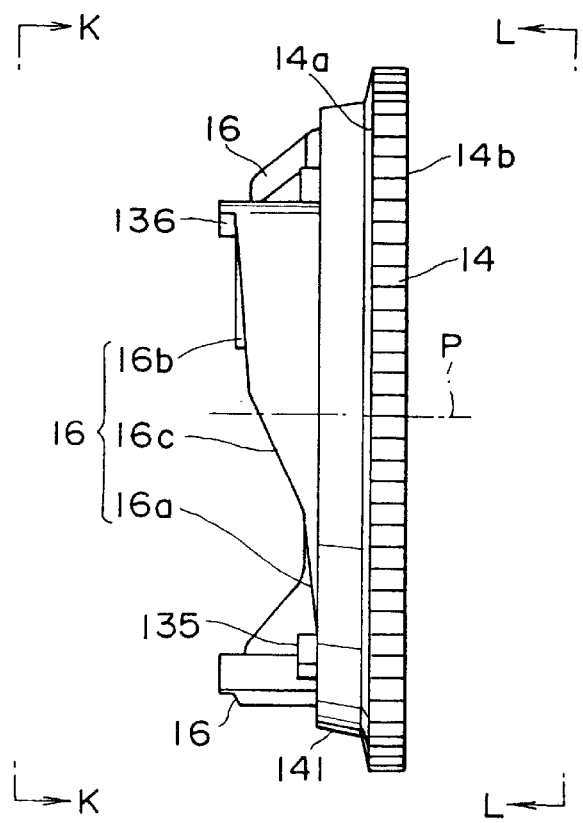
FIG. 39 is a side view of an adjuster ring of the flange back focus adjusting mechanism.
Figure 40:
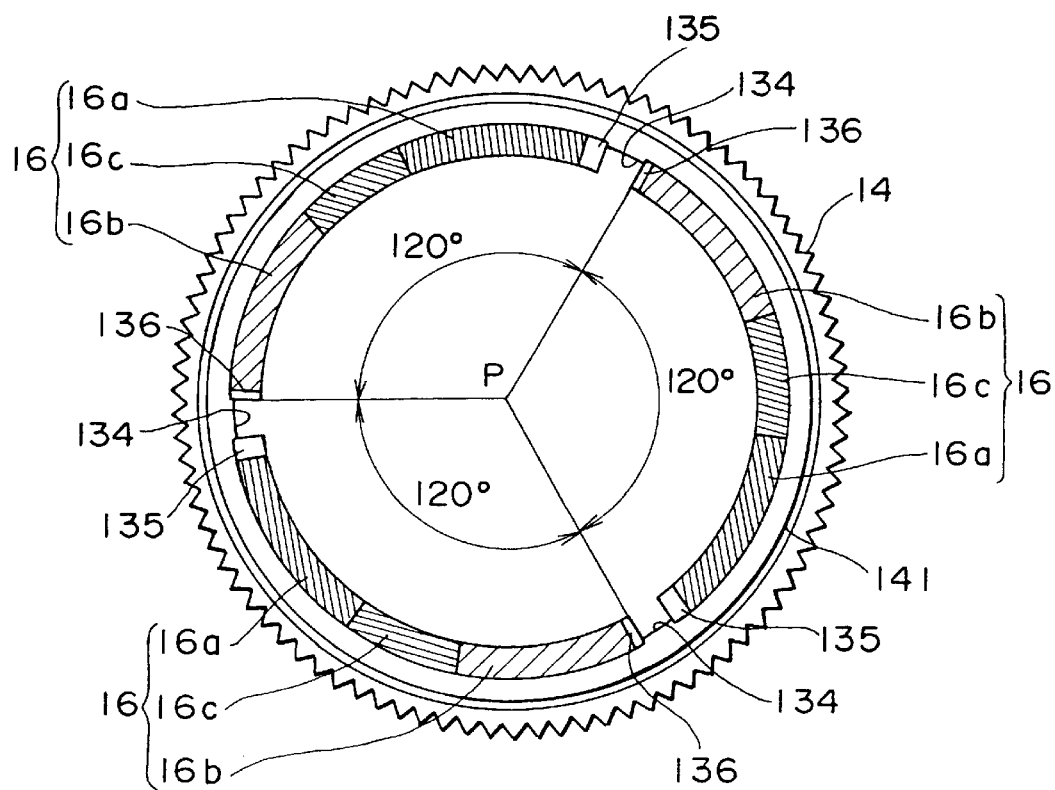
FIG. 40 is a front view taken in the direction shown by arrows K—K in FIG. 39.
Figure 41:
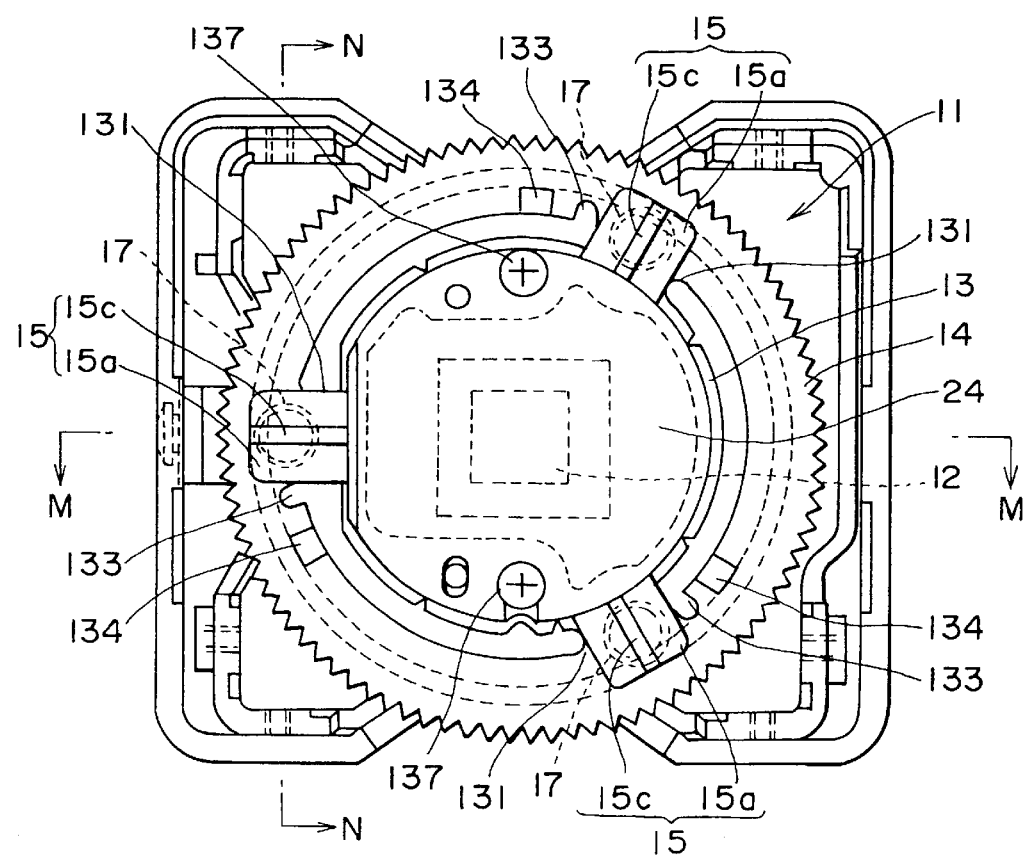
FIG. 41 is a rear view of the CCD holder and the adjuster ring mounted to the cylindrical portion.

As shown in FIGS. 33, 39, and 42, the front surface 14a of the adjuster ring 14 is integrally formed with an annular taper surface 141 around the cam surface 16a where the height of cams 16 becomes the lowest, in coaxial relationship therewith. A lock member 19 is embedded inside the screw mounting portion 106 of the front panel chassis 2A so as to be releasably pressed on the taper surface 141 by the set screw 27.

The lock member 19 is a member integrally molded of an elastic synthetic resin or the like as shown in FIGS. 48A to 48E. The lock member 19 has an invertedly U-shaped configuration as viewed in front and rear elevations, consisting of a locking shoe 142 adapted to be pressed on the taper surface 141 of the adjuster ring 14 and a pair of return springs 143 as a retainer mechanism extending downward from the opposite ends of the locking shoe 142. Each return spring 143 has a substantially V-shaped configuration as viewed in side elevation. The locking shoe 142 is formed with two hollow portions 144 for enhancing the elasticity.

As shown in FIGS. 33 and 42, the lock member 19 is provided in the vicinity of the screw mounting portion 106 of the front panel chassis 2A in such a manner that the return springs 143 are inserted into a space 145 defined between the front panel chassis 2A and the front panel cover 2B in the direction of the arrow a so as to pass the upper and lower sides of the screw mounting portion 106 and that the locking shoe 142 is interposed between the screw mounting portion 106 and the taper surface 141 of the adjuster ring 14. In this condition, the set screw 27 inserted from the screw hole 107 of the front panel cover 2B is mounted to the screw mounting portion 106 of the front panel chassis 2A. When the set screw 27 is tightened in the direction shown by an arrow e in FIG. 42, the locking shoe 142 of the lock member 19 is pushed by the front end of the set screw 27, so that the locking shoe 142 is pressed on the taper surface 141 of the adjuster ring 14 in the direction of the arrow e against the outward biasing forces of the return springs 143, thereby locking the adjuster ring 14 to obtain its nonrotatable condition.

Conversely, when the set screw 27 is loosened in the direction shown by an arrow f in FIG. 42, the locking shoe 142 is separated from the taper surface 141 of the adjuster ring 14 by the outward biasing forces of the return springs 143 in the direction of the arrow f, thereby allowing rotation of the adjuster ring 14.

As mentioned above, the locking shoe 142 and the return springs 143 of the lock member 19 are integrally molded of an elastic synthetic resin or the like, so that the lock member 19 is configured as a one-piece member. Accordingly, as compared with a lock member configured by integrating separate parts, i.e., the locking shoe 142 made of synthetic resin and the return springs 143 made of leaf springs or the like, the number of parts and assembly steps can be reduced to achieve a cost reduction.

Having thus described a specific preferred embodiment of the present invention, it should be noted that the present invention is not limited to the above preferred embodiment, but various changes and modifications may be made without departing from the scope of the present invention. For example, the present invention is not limited to a CCD camera, but it is applicable to various video cameras and various electronic equipment.

What is claimed is:

1. In a video camera having a front panel, on which a lens mount is formed and an imaging device spaced at an adjustable distance from said lens mount along an optical axis; the improvement comprising:

an adjuster ring provided inside of said front panel so as to be circumferentially rotatable about said optical axis for adjusting said adjustable distance;

said adjuster ring including three arcuate cams circumferentially equally spaced form each other;

an imaging device holder for holding said imaging device, said imaging device holder including three cam followers circumferentially equally spaced from each other; and three springs interposed between said front panel and a spring seat formed on said three cam followers of said imaging device holder for respectively pressing said three cam followers onto said three arcuate cams of said adjuster ring along said optical axis.

2. A video camera according to claim 1 wherein said spring seats extend radially from the outer circumference of said image device holder in perpendicular relationship with said optical axis for receiving one end of a corresponding spring.

3. A video camera according to claim 2 including a spring retainer formed on one side surface of said spring seat at a substantially central portion thereof for engaging said one end of said corresponding spring.

4. A video camera according to claim 3 including a single cam following rib formed on the other side surface of said spring seat at a substantially central portion thereof so as to extend radially for making contact with the corresponding arcuate cam.

* * * * *